US007321569B2

(12) United States Patent
Takagi et al.

(10) Patent No.: US 7,321,569 B2
(45) Date of Patent: *Jan. 22, 2008

(54) RADIO COMMUNICATION SYSTEM USING POINT-TO-POINT AND POINT-TO-MULTIPOINT USER INFORMATION COMMUNICATIONS

(75) Inventors: Masahiro Takagi, Tokyo (JP); Keiji Tsunoda, Kanagawa (JP); Takafumi Sakamoto, Kanagawa (JP); Eiji Kamagata, Kanagawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 88 days.

This patent is subject to a terminal disclaimer.

(21) Appl. No.: 11/223,046

(22) Filed: Sep. 12, 2005

(65) Prior Publication Data

US 2006/0056341 A1    Mar. 16, 2006

Related U.S. Application Data

(62) Division of application No. 09/639,072, filed on Aug. 16, 2000, now Pat. No. 6,965,580.

(30) Foreign Application Priority Data

Aug. 16, 1999   (JP)   ................................ 11-229853

(51) Int. Cl.
*H04Q 7/00* (2006.01)
*H04B 7/212* (2006.01)
*G06F 11/00* (2006.01)

(52) U.S. Cl. ...................... 370/312; 370/328; 370/348; 370/432

(58) Field of Classification Search ..................... None
See application file for complete search history.

(56) References Cited

U.S. PATENT DOCUMENTS 6,026,296 A * 2/2000 Sanders et al. .......... 455/426.1

(Continued)

FOREIGN PATENT DOCUMENTS

EP    0 035 230 A2    9/1981

(Continued)

OTHER PUBLICATIONS

Draft International Standard ISO/IEC 8802-11, IEEE p802.11/D8.0, 1, May 1998, Part 11: "Wireless LAN Medium Access Control (MAC) and Physical Layer (PHY) specifications."

*Primary Examiner*—Wing Chan
*Assistant Examiner*—Robert C Scheibel
(74) *Attorney, Agent, or Firm*—Foley & Lardner LLP

(57) ABSTRACT

An information communication scheme for enabling the radio base station to carry out both point-to-point user information communications and point-to-multipoint user information communications with respect to radio terminals is disclosed. A first media access control identifier is allocated to a radio terminal which made a connection request, a correspondence between the first media access identifier and the radio terminal is broadcast, and a user information destined to the radio terminal is transmitted using a time-slot corresponding to the first media access control identifier. On the other hand, a second media access control identifier is allocated to a multicast information identifier, a correspondence between the second media access control identifier and the multicast information identifier is transmitted, and the multicast information is transmitted using a time-slot corresonding to the second media access control identifier.

12 Claims, 19 Drawing Sheets

U.S. PATENT DOCUMENTS

| | | | | |
|---|---|---|---|---|
| 6,144,651 | A | * | 11/2000 | Rinchiuso et al. .......... 370/335 |
| 6,157,622 | A | * | 12/2000 | Tanaka et al. .............. 370/312 |
| 6,240,089 | B1 | * | 5/2001 | Okanoue et al. ............ 370/390 |
| 6,304,558 | B1 | * | 10/2001 | Mysore ...................... 370/312 |
| 6,556,835 | B1 | * | 4/2003 | Raivisto ..................... 455/466 |
| 6,717,925 | B1 | * | 4/2004 | Leppisaari et al. ......... 370/312 |
| 6,741,575 | B1 | * | 5/2004 | Zhang et al. ............... 370/329 |

FOREIGN PATENT DOCUMENTS

| | | |
|---|---|---|
| EP | 0 877 512 A2 | 11/1998 |
| JP | 9-200118 A | 7/1997 |

* cited by examiner

| MEDIA ACCESS CONTROL IDENTIFIER | INFORMATION TYPE IDENTIFIER | |
|---|---|---|
| #0 | RADIO CONTROL BROADCAST INFORMATION | |
| #1 | TERMINAL-1 | TERMINAL ID-1 |
| #2 | UNALLOCATED | |
| #3 | MULTICAST-1 | GROUP-1 |
| #4 | TERMINAL-2 | TERMINAL ID-2 |
| #5 | MULTICAST-4 | GROUP-4 |
| ⋮ | ⋮ | ⋮ |

| MEDIA ACCESS CONTROL IDENTIFIER | INFORMATION TYPE IDENTIFIER | |
|---|---|---|
| #0 | RADIO CONTROL BROADCAST INFORMATION | |
| #3 | MULTICAST-3 | GROUP-3 |
| UNALLOCATED | OWN TERMINAL | TERMINAL ID-3 |

FIG.9

| MEDIA ACCESS CONTROL IDENTIFIER | INFORMATION TYPE IDENTIFIER | |
|---|---|---|
| ≈ | ≈ | ≈ |
| #3 | MULTICAST-1 | GROUP-1 |
| ≈ | ≈ | ≈ |
| #8 | TERMINAL-3 | TERMINAL ID#3 |
| #9 | DATALINK CONTROL INFORMATION FOR MULTICAST-1 BY TERMINAL-3 | DATALINK CONNECTION (GROUP-1,TREMINAL ID#3) |
| ≈ | ≈ | ≈ |

FIG.10

| MEDIA ACCESS CONTROL IDENTIFIER | INFORMATION TYPE IDENTIFIER | |
|---|---|---|
| ≈ | ≈ | ≈ |
| #3 | MULTICAST-1 | GROUP-1 |
| #8 | OWN TERMINAL | TERMINAL ID#3 |
| #9 | DATALINK CONTROL INFORMATION FOR MULTICAST-1 | DATALINK CONNECTION (GROUP-1,TREMINAL ID#3) |
| ≈ | ≈ | ≈ |

FIG.11

| TARGET MEDIA ACCESS CONTROL IDENTIFIER | CONTROL INFORMATION MEDIA ACCESS CONTROL IDENTIFIER | DATALINK CONNECTION IDENTIFIER |
|---|---|---|
| #0 | — | #0 |
| #0 | — | #1 |
| #1 | #1 | #0 |
| #1 | #1 | #1 |
| #3 | #1,#8 | #2 |
| #3 | #1,#8 | #3 |
| #8 | #8 | #0 |
|  |  |  |

FIG.12

| TARGET MEDIA ACCESS CONTROL IDENTIFIER | CONTROL INFORMATION MEDIA ACCESS CONTROL IDENTIFIER | DATALINK CONNECTION IDENTIFIER |
|---|---|---|
| #0 | — | #0 |
| #0 | — | #1 |
| #3 | #8 | #3 |
|  |  |  |

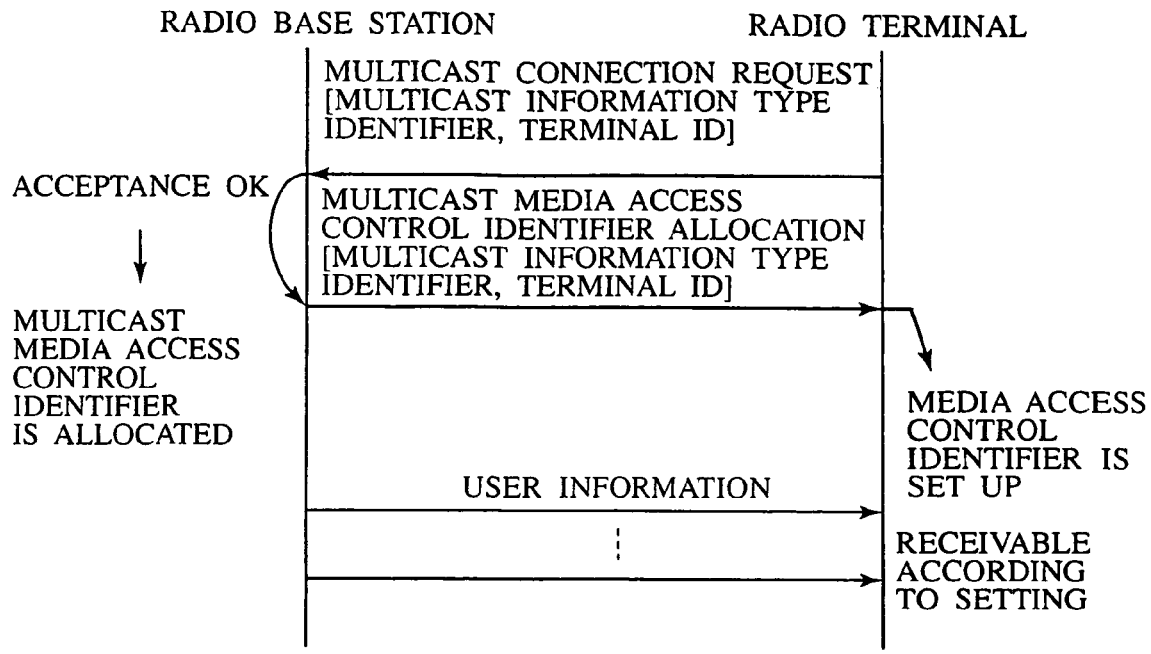
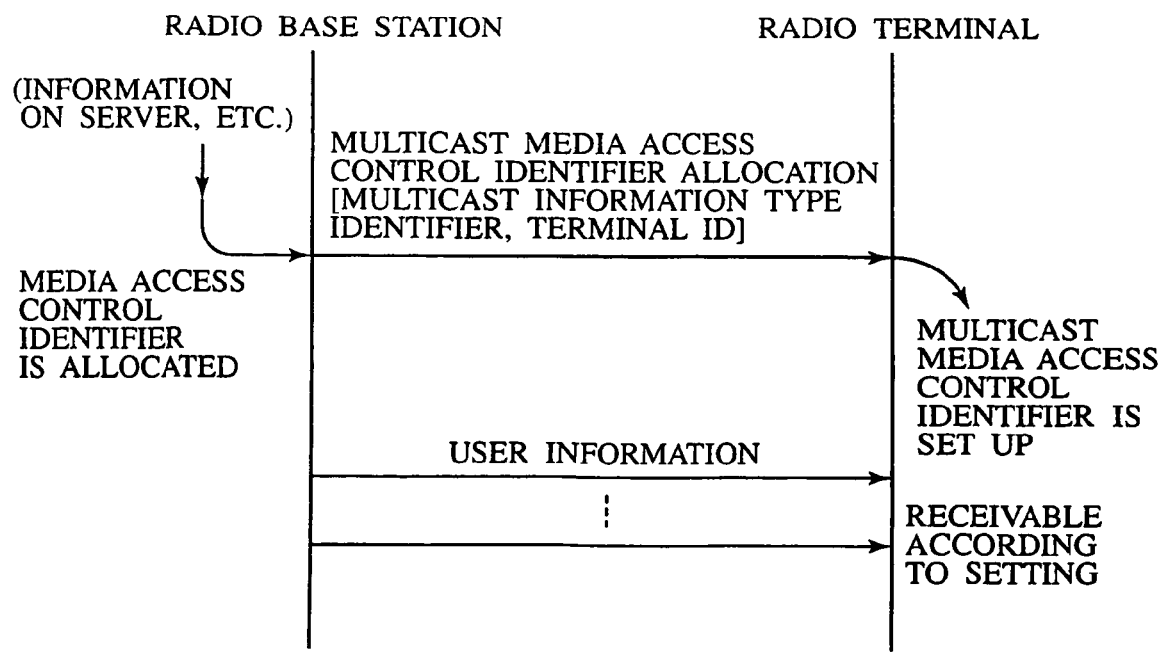

FIG.17

| MEDIA ACCESS CONTROL IDENTIFIER | INFORMATION TYPE IDENTIFIER | |
|---|---|---|
| #0 | RADIO CONTROL BROADCAST INFORMATION | |
| #1 | BROADCAST | GROUP-0 |
| #2 | TERMINAL-1 | TERMINAL ID-1 |
| ⋮ | ⋮ | ⋮ |

FIG.18

| MEDIA ACCESS CONTROL IDENTIFIER | INFORMATION TYPE IDENTIFIER | |
|---|---|---|
| #0 | RADIO CONTROL BROADCAST INFORMATION | |
| #1 | BROADCAST | GROUP-0 |
| UNALLOCATED | OWN TERMINAL | TERMINAL ID-2 |

FIG.19

| MEDIA ACCESS CONTROL IDENTIFIER | INFORMATION TYPE IDENTIFIER | |
|---|---|---|
| #0 | RADIO CONTROL BROADCAST INFORMATION | |
| #1 | ALL MULTICAST | ALL GROUP ID |
| #2 | TERMINAL-1 | TERMINAL ID-1 |
| ⋮ | ⋮ | ⋮ |

FIG.20

| MEDIA ACCESS CONTROL IDENTIFIER | INFORMATION TYPE IDENTIFIER | |
|---|---|---|
| #0 | RADIO CONTROL BROADCAST INFORMATION | |
| #1 | ALL MULTICAST | GROUP ID-2 GROUP ID-3 |
| UNALLOCATED | OWN TERMINAL | TERMINAL ID-2 |

FIG.21

| MEDIA ACCESS CONTROL IDENTIFIER | DATALINK CONNECTION IDENTIFIER | INFORMATION TYPE IDENTIFIER | |
|---|---|---|---|
| #0 | #0 | RADIO CONTROL BROADCAST INFORMATION A | |
| #0 | #1 | RADIO CONTROL BROADCAST INFORMATION B | |
| #1 | #0 | DESTINED TO TERMINAL-1 A | TERMINAL ID-1 |
| #1 | #1 | DESTINED TO TERMINAL-1 B | TERMINAL ID-1 |
| ⋮ | ⋮ | ⋮ | ⋮ |
| #5 | #0 | MULTICAST-1 | GROUP ID-1 |
| #5 | #1 | MULTICAST-2 | GROUP ID-2 |

FIG.22

| MEDIA ACCESS CONTROL IDENTIFIER | DATALINK CONNECTION IDENTIFIER | INFORMATION TYPE IDENTIFIER | |
|---|---|---|---|
| #0 | #0 | RADIO CONTROL BROADCAST INFORMATION A | |
| #0 | #1 | RADIO CONTROL BROADCAST INFORMATION B | |
| #5 | #1 | MULTICAST-2 | GROUP ID-2 |

RADIO COMMUNICATION SYSTEM USING POINT-TO-POINT AND POINT-TO-MULTIPOINT USER INFORMATION COMMUNICATIONS

The present application is a divisional of U.S. application Ser. No. 09/639,072, now U.S. Pat. No. 6,965,580, filed Aug. 16, 2000, the entire contents of which is incorporated herein by reference.

BACKGROUND OF THE INVENTION

1. Field of the Invention

The present invention relates to a radio base station device, a radio terminal device and an information communication method for realizing radio communications.

2. Description of the Background Art

Systems for carrying out communications between a radio base station and a radio terminal can be largely classified into a public system in which the radio base station carried out a centralized management of radio bands and a private system in which the radio terminal carries out communications autonomously and radio bands are not managed rigorously.

Conventionally, in the public system, it has been customary to exchange user information through a point-to-point connection between the radio base station and the individual radio terminal.

For example, in the cellular telephone system using TDMA (Time Division Multiple Access) scheme, the radio system manager allocates some time-slot to each radio terminal such that communications between that radio terminal and the radio base station are carried out using only that allocated time-slot.

In such a system, the control methods for carrying out the point-to-point user information communications are defined in advance, and these control methods includes one in which the radio base station broadcasts to a plurality of radio terminals. For example, in the paging for calling up a specific radio terminal, an ID of the radio terminal to be called up and a message containing a command to make the corresponding radio terminal to return a response are broadcast from the radio base station to all radio terminals within an area (called cell) to which radio signals can reach from that radio base station.

Such a conventional radio communication system is provided with means for broadcasting radio control information from the radio base station to all the radio terminals located within the cell of that radio base station. However, the communication involving a radio terminal at least on one side, such as speech communication in the cellular telephone to be specific, has been carried out in the point-to-point fashion, and such a conventional radio communication system has not been provided with any means for transmitting user information from the radio base station to a plurality of radio terminals simultaneously or scheme in which radio terminals receive such user information regardless of whether it is destined to the own terminal or not.

On the other hand, the radio LAN technology that belongs to the private system is compatible with communication systems based on wire Ethernet, and provided with means for each radio terminal or radio base station to transmit information at a variable rate simultaneously with respect to a plurality of radio terminals or a plurality of radio terminals and radio base stations.

In such a system, slots for user information and slots for control information are coexisting without any distinction, or slots with mixed information are existing. For this reason, a receiving device side receives all transmitted information without distinguishing user information and control information, and then judges whether they are destined to the own terminal or not according to the control information among the received information.

However, in this case, contrary to the case of the public system, there is no point-to-point information exchange, and all information must be received once so that there has been a problem that many wasteful processings are involved. Also, in the case where a communication terminal is a mobile terminal with no power supply, there also arises a problem of the power capacity shortage.

As described, it has been impossible to carry out point-to-multipoint user information communications in the conventional radio system of the public system type, whereas it has been impossible to carry out point-to-point user information communications in the conventional radio system of the private system type.

SUMMARY OF THE INVENTION

It is therefore an object of the present invention to provide a radio base station device, a radio terminal device, and an information communication method which are capable of enabling the radio base station to carry out both point-to-point user information communications and point-to-multipoint user information communications with respect to radio terminals.

According to one aspect of the present invention there is provided a radio base station device, comprising: a reception unit configured to receive a connection request from one radio terminal (a random access channel, for example); a first allocation unit configured to allocate (dynamically, for example) a first media access control identifier which is an unused media access control identifier, to said one radio terminal that issued the connection request; a broadcast unit configured to broadcast a correspondence between the first media access control identifier and said one radio terminal (a second broadcast channel, for example); a second allocation unit configured to allocate a second media access control identifier to an identifier (a multicast IP address or a content name, for example) of a multicast information that are to be received by a plurality of radio terminals; a first transmission unit configured to transmit a correspondence information for enabling said plurality of radio terminals to recognize a correspondence between the second media access control identifier and the identifier of the multicast information; and a second transmission unit configured to transmit a time-slot corresponding to the first media access control identifier with a user information destined to said one radio terminal loaded thereon, and a time-slot corresponding to the second media access control identifier with the multicast information loaded thereon.

According to this aspect of the present invention, it becomes possible to provide an efficient radio base station device in which radio channels for transmission to a plurality of terminals can be collected into one channel by carrying out the multicast on a radio section, in addition to making a point-to-point connection request individually.

Preferably, the first transmission unit transmits the correspondence information using a radio control broadcast channel (channel 401/402/406, for example) that is set to be received by any radio terminal located within an area of the radio base station device (located within a range to which radio signals from the radio base station device reach, for example).

By broadcasting the multicast information using the radio control broadcast channel in this way, it becomes possible for at least the downlink side to listen to the multicast broadcast without establishing connections. Also, even in the case where uplink channels are necessary, it suffices to set up only the uplink section.

Preferably, the radio base station device further comprises a unit configured to obtain information on a correspondence between said one radio terminal and the identifier of the multicast information that said one radio terminal wishes to receive, wherein the first transmission unit transmits the correspondence information to said one radio terminal, using either a radio control broadcast channel that is set to be received by any radio terminal located within an area of the radio base station device or a time-slot corresponding to the first media access control identifier.

By ascertaining the multicast information that the radio terminal device wishes to receive in this way, it becomes possible to limit the multicast broadcast reception only to the radio terminal device for which the identifier of the multicast information is known or for which the reception is permitted.

Preferably, the radio base station device further comprises: a third allocation unit configured to allocate a broadcast media access control identifier to be received by any radio terminal located within an area of the radio base station device; and a notification unit configured to notify any radio terminal located within the area of the radio base station device to receive the broadcast media access control identifier, using a radio control broadcast channel (channel 401/402/406, for example) that is set to be received by any radio terminal located within the area of the radio base station device.

In this way, it becomes possible use arbitrary channel for the broadcast. Also, by setting a user channel which has a far larger communication capacity than a control channel in general, as a channel for the broadcast, for example, it becomes possible to transmit a large amount of broadcast information toward all the radio terminal devices.

Preferably, the second allocation unit allocates a media access control identifier that is set to be received by any radio terminal located within an area of the radio base station device as the second media access control identifier.

By conveying all the multicast information using the user channel for the broadcast, for example, it becomes possible to realize the effective utilization of radio channels by multiplexing.

Preferably, the reception unit receives the connection request that contains a multicast connection request, from said one radio terminal.

Preferably, the radio base station device further comprises a set up unit configured to set up a datalink connection with respect to said one radio terminal (by using an individual control channel, for example), wherein the second allocation unit allocates a set of the second media access control identifier and a datalink connection identifier to the identifier of the multicast information, the first transmission unit transmits the correspondence information regarding a correspondence between the identifier of the multicast information and the set of the second media access control identifier and the datalink connection identifier, and the second transmission unit transmits a time-slot corresponding to the set of the second media access control identifier and the datalink connection identifier with the multicast information loaded thereon.

By adding a datalink connection identifier in this way, it becomes possible to multiplex radio channels within the same media access control identifier. In particular, different multicast groups using different datalink connections can be provided using the same media access control identifier for the multicast, so that radio channels can be used efficiently.

Moreover, when combined with the feature that the second allocation unit allocates a media access control identifier that is set to be received by any radio terminal located within an area of the radio base station device as the second media access control identifier, it becomes possible to set up a plurality of datalink connections in correspondence to the broadcast media access control identifier, and use these datalink connections for mutually different multicast broadcasts.

Preferably, the radio base station device further comprises: a set up unit configured to set up a datalink connection with respect to said one radio terminal; and a third allocation unit configured to allocate another media access control identifier different from those already allocated by the first and second allocation units, to a datalink control information with respect to the user information, wherein the first transmission unit transmits said another media access control identifier as a media access control identifier for the datalink information with respect to the user information.

In this way, it becomes possible to allocate the media access control identifier of the uplink datalink control information (ARQ information, for example) for the downlink multicast information to each radio terminal separately, so that the radio base station can provide arbitration among a plurality of radio terminals that request the uplink datalink control channels. Also, the uplink datalink control information for the downlink unicast information and the uplink datalink control information for the downlink multicast information for one terminal are distinguished by the media access control identifiers, so that the allocation of the datalink connection identifier for the multicast can be carried out regardless of the state of the allocation of the datalink connection identifier for the unicast. In this way, the radio base station can carry out the datalink control for the downlink multicast.

Preferably, the radio base station device further comprises a set up unit configured to set up a datalink connection with respect to said one radio terminal, wherein the second allocation unit sets a value that is unused as a datalink connection identifier for datalink control of received information (not allocated to the unicast of the radio terminal), as a value of the datalink connection identifier to be allocated to the identifier of the multicast information, with respect to said one radio terminal which receives the multicast information using a time-slot corresponding to the second media access control identifier.

In this way, it becomes possible to carry out the allocation of the datalink connection identifier for the multicast, without using the datalink connection identifier allocated for the unicast. Consequently, even when the media access control identifier of the uplink datalink control information (ARQ information, for example) for the downlink unicast information and the media access control identifier of the downlink datalink control information for the downlink multicast information are set to be identical, it is possible to separate these datalink control information accurately. In this way, the radio base station can carry out the datalink control for the downlink multicast.

Preferably, the connection request from the radio terminal is received via a wire network.

By using the radio base station in such a configuration, it becomes possible for the radio terminal to transmit the control information and the user information to the radio base station via the second radio base station different from that radio base station and the wire network. In the case where the amount of information transmitted by the radio terminal is less than the amount of information received by the radio terminal, it becomes possible to lower the radio frequency to be utilized for communications between the second radio base station and the radio terminal, and to make the frequency band narrower, so that such a radio base station configuration can contribute to the reduction of the power or the size of the radio terminal.

According to another aspect of the present invention there is provided a radio terminal device, comprising: a transmission unit configured to transmit a connection request to a radio base station; a first reception unit configured to receive a first media access control identifier allocated to the radio terminal device, which is broadcast from the radio base station (second broadcast channel, for example); a second reception unit configured to receive an identifier (multicast IP address or content name, for example) of a multicast information to be received by a plurality of radio terminals and a second media access control identifier allocated to the identifier of the multicast information, which are transmitted from the radio base station; and a third reception unit configured to receive a user information destined to the radio terminal device which is loaded on a time-slot corresponding to the first media access control identifier, and the multicast information which is loaded on a time-slot corresponding to the second media access control identifier.

According to this aspect of the present invention, it becomes possible to provide an efficient radio terminal device in which radio channels for transmission to a plurality of terminals can be collected into one channel by carrying out the multicast on a radio section, in addition to making a point-to-point connection request individually.

Preferably, the second reception unit receives the identifier of the multicast information and the second media access control identifier using a radio control broadcast channel (channel 401/402/406, for example) that is set to be received by any radio terminal located within an area of the radio base station device.

By broadcasting the multicast information using the radio control broadcast channel in this way, it becomes possible for at least the downlink side to listen to the multicast broadcast without establishing connections. Also, even in the case where uplink channels are necessary, it suffices to set up only the uplink section.

Preferably, the second reception unit receives the second media access control identifier as the user information destined to the radio terminal device.

In this way, as the radio terminal device requests a desired multicast information or the radio base station device knows that information in advance, those radio terminal devices which are not wishing that multicast information need not receive that information.

Preferably, the radio terminal device further comprises a fourth reception unit configured to receive a broadcast media access control identifier to be received by any radio terminal located within an area of the radio base station, wherein the third reception unit also receives information loaded on a time-slot corresponding to the broadcast media access control identifier.

In this way, by setting a user channel which has a far larger communication capacity than a control channel in general, as a channel for the broadcast, for example, it becomes possible to receive a large amount of broadcast information from the radio base station device.

Preferably, the transmission unit transmits the connection request that contains a multicast connection request.

Preferably, the radio terminal device further comprises a set up unit configured to set up a datalink connection with respect to the radio base station (by using an individual control channel, for example), wherein the second reception unit receives the identifier of the multicast information and a set of the second media access control identifier and a datalink connection identifier allocated to the identifier of the multicast information, and the third reception unit receives the multicast information loaded on a time-slot corresponding to the set of the second media access control identifier and the datalink connection identifier.

By adding a datalink connection identifier in this way, it becomes possible to multiplex radio channels within the same media access control identifier. In particular, different multicast groups using different datalink connections can be provided using the same media access control identifier for the multicast, so that radio channels can be used efficiently.

Preferably, the radio terminal device further comprises: a set up unit configured to set up a datalink connection with respect to the radio base station; a fourth reception unit configured to receive a third media access control identifier allocated to an identifier of a datalink control information for the multicast information loaded on a time-slot corresponding to the second media access control identifier; and a second transmission unit configured to transmit the datalink control information for the multicast information, using a time-slot corresponding to the third media access control identifier.

In this way, as the radio base station allocates the media access control identifier of the uplink datalink control information (ARQ information, for example) for the downlink multicast information to each radio terminal separately, and as the radio base station allocates separate time-slots to different radio terminals using these media access control identifiers, it becomes possible for the radio terminal to transmit the datalink control information efficiently and surely to the radio base station by utilizing the uplink datalink control channel without causing any collision with the other radio terminals. In this way, the radio terminal can carry out the datalink control for the downlink multicast.

Preferably, the radio terminal device further comprises: a set up unit configured to set up a datalink connection with respect to the radio base station; and a second transmission unit configured to transmit the datalink control information for the multicast information, using a time-slot corresponding to the first media access control identifier.

In this way, the radio terminal uses the media access control identifier allocated for the unicast also for transmission of the uplink datalink control information for the downlink multicast information. As the radio base station allocates separate time-slots to different radio terminals using this media access control identifier, it becomes possible for the radio terminal to transmit the datalink control information efficiently and surely to the radio base station by utilizing the uplink datalink control channel without causing any collision with the other radio terminals. In this way, the radio terminal can carry out the datalink control for the downlink multicast.

Preferably, the connection request to the radio base station is transmitted to the second radio base station.

In this way, it becomes possible for the radio terminal to transmit the control information and the user information to the radio base station via the second radio base station different from that radio base station and the wire network. In the case where the amount of information transmitted by the radio terminal is less than the amount of information received by the radio terminal, it becomes possible to lower the radio frequency to be utilized for communications between the second radio base station and the radio terminal, and to make the frequency band narrower, so that such a radio base station configuration can contribute to the reduction of the power or the size of the radio terminal.

According to another aspect of the present invention there is provided a method of information communication from a radio base station to a radio terminal, comprising the steps of: making a connection request from the radio terminal to the radio base station; allocating (dynamically, for example) a first media access control identifier which is an unused media access control identifier, to the radio terminal, at the radio base station which received the connection request; transmitting a correspondence between the first media access control identifier and the radio terminal, from the radio base station to the radio terminal; transmitting a user information from the radio base station to the radio terminal using a time-slot corresponding to the first media access control identifier; allocating (dynamically, for example) a second media access control identifier to a multicast information to be received by a plurality of radio terminals, at the radio base station; transmitting a correspondence information for enabling said plurality of radio terminals to recognize a correspondence between the second media access control identifier and the identifier of the multicast information; and transmitting the multicast information from the radio base station to said plurality of radio terminals using a time-slot corresponding to the second media access control identifier.

According to this aspect of the present invention, it becomes possible to improve the radio channel utilization efficiency by carrying out the point-to-multipoint transmission in addition to carrying out a point-to-point transmission individually.

Other features and advantages of the present invention will become apparent from the following description taken in conjunction with the accompanying drawings.

BRIEF DESCRIPTION OF THE DRAWINGS

FIG. 9 is a diagram showing one example of a correspondence table in a media access control identifier management unit of the radio base station in the radio communication system of FIG. 8.

FIG. 10 is a diagram showing one example of a correspondence table in a media access control identifier management unit of the radio terminal in the radio communication system of FIG. 8.

FIG. 11 is a diagram showing another example of a correspondence table in a media access control identifier management unit of the radio base station in the radio communication system of FIG. 8.

FIG. 12 is a diagram showing another example of a correspondence table in a media access control identifier management unit of the radio terminal in the radio communication system of FIG. 8.

FIG. 13 is a sequence chart showing an exemplary broadcast type multicast link connection procedure using a connection request from a radio terminal according to the second embodiment of the present invention.

FIG. 14 is a sequence chart showing an exemplary broadcast type multicast link connection procedure using a known radio terminal information according to the second embodiment of the present invention.

FIG. 17 is a diagram showing one example of a correspondence table in a media access control identifier management unit of the radio base station according to the third embodiment of the present invention.

FIG. 18 is a diagram showing one example of a correspondence table in a media access control identifier management unit of the radio terminal according to the third embodiment of the present invention.

FIG. 19 is a diagram showing one example of a correspondence table in a media access control identifier management unit of the radio base station according to the fourth embodiment of the present invention.

FIG. 20 is a diagram showing one example of a correspondence table in a media access control identifier management unit of the radio terminal according to the fourth embodiment of the present invention.

FIG. 21 is a diagram showing one example of a correspondence table in a media access control identifier management unit of the radio base station according to the fifth embodiment of the present invention.

FIG. 22 is a diagram showing one example of a correspondence table in a media access control identifier management unit of the radio terminal according to the fifth embodiment of the present invention.

DETAILED DESCRIPTION OF THE PREFERRED EMBODIMENTS

Referring now to FIG. 1 to FIG. 12, the first embodiment of a radio communication system according to the present invention will be described in detail.

Figure 1:
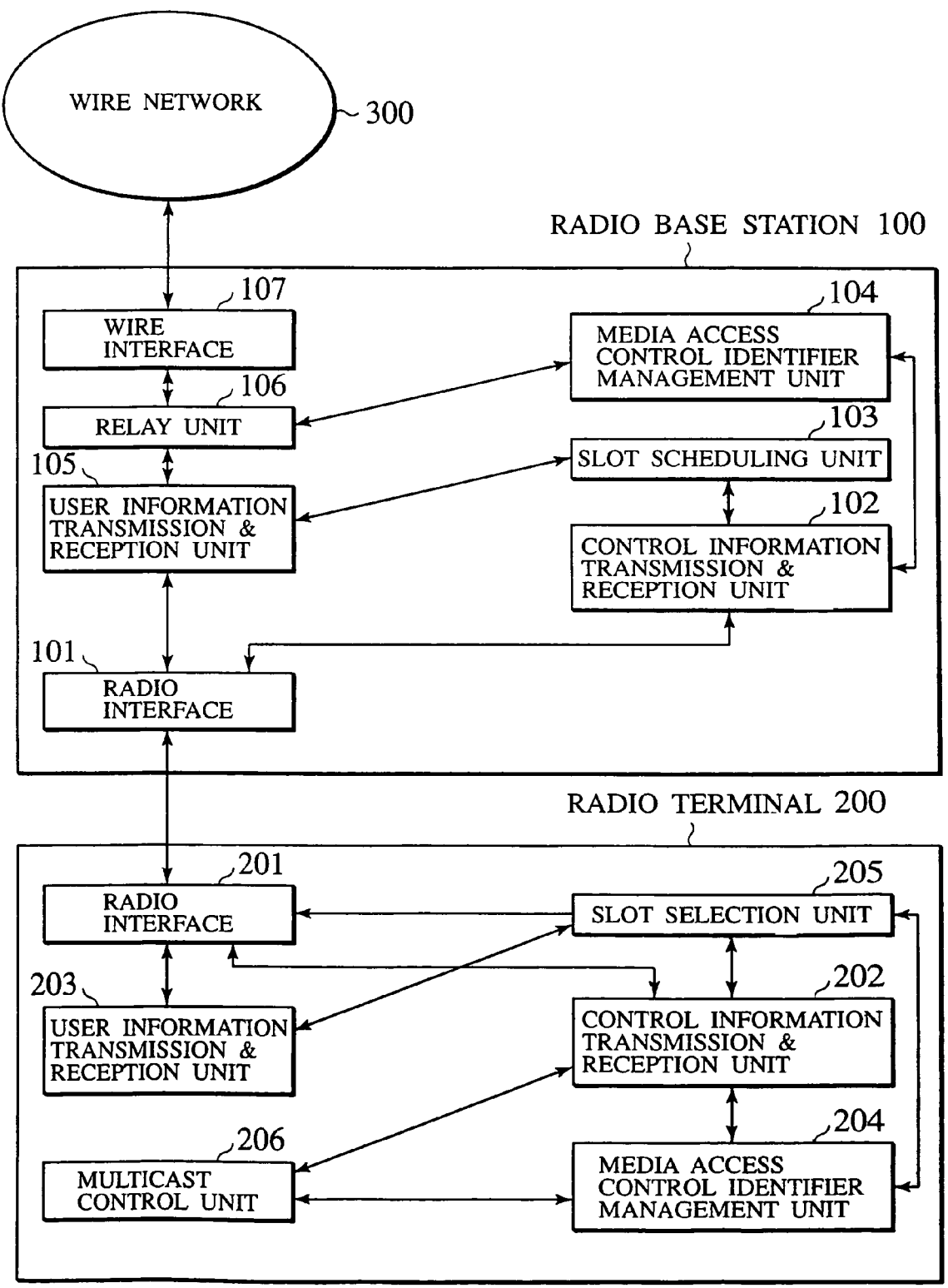
FIG. 1 is a block diagram showing an exemplary network configuration including a radio base station and a radio terminal of a radio communication system according to the first embodiment of the present invention.

FIG. 1 shows an exemplary network configuration including a radio base station 100 and a radio terminal 200 according to the first embodiment.

As shown in FIG. 1, this network comprises a wire network 300, a radio base station 100 connected with the wire network 300, and a radio terminal 200 which is located within a cell of the radio base station 100. Note that FIG. 1 only shows one radio base station 100 but it is possible to have plural radio base stations in general. Note also that the radio terminal 200 is capable of carrying out communications with the other radio terminals through one radio base station or a plurality of radio base stations.

The radio base station 100 has a radio interface 101, a control information transmission and reception unit 102, a slot scheduling unit 103, a media access control identifier management unit 104, a user information transmission and reception unit 105, a relay unit 106, and a wire interface 107.

The radio terminal 200 has a radio interface 201, a control information transmission and reception unit 202, a user information transmission and reception unit 203, a media access control identifier management unit 204, a slot selection unit 205, and a multicast control unit 206.

Figure 2:
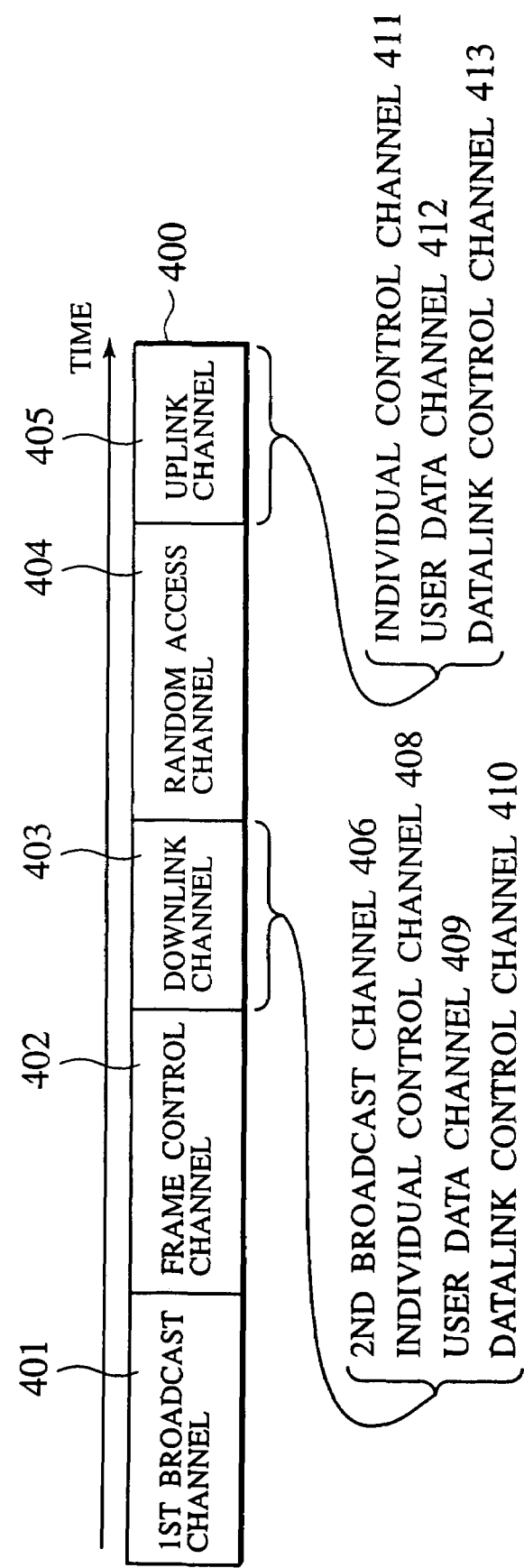
FIG. 2 is a diagram showing an exemplary configuration of a media access control frame used in the radio communication system of FIG. 1.

FIG. 2 shows an exemplary configuration of a media access control frame to be transmitted and received by the radio base station 100 and the radio terminal 200.

The media access control frame 400 has a first broadcast channel 401, a frame control channel 402, a downlink channel 403 (in a direction from the radio base station 100 to the radio terminal 200), a random access channel 404, and an uplink channel 405 (in a direction from the radio terminal 200 to the radio base station 100).

The first broadcast channel 401 is used for a notification of the existence of the radio base station 100, for example.

The frame control channel 402 is used in notifying information regarding this frame, such as a time-slot configuration of this frame, for example. Note that the frame control channel 402 can also be regarded as a type of the radio control broadcast channel.

The downlink channel 403 is used in transmitting user information and control information in a direction from the radio base station 100 to the radio terminal 200.

The random access channel 404 is used commonly by a plurality of radio terminals (and usually has a function for resolving collisions).

The uplink channel 405 is used in transmitting user information and control information in a direction from the radio terminal 200 to the radio base station 100.

The downlink channel 403 can contain a second broadcast channel 406, an individual control channel 408, a user data channel 409, and a datalink control channel 410. The uplink channel 405 can contain an individual control channel 411, a user data channel 412, and a datalink control channel 413. In addition, a plurality of channels that are identified by media access control identifiers, for example, may be contained in each of the individual control channel, the user data channel, and the datalink control channel.

In this embodiment, it is assumed that the time division media access control is carried out, and that the media access control frame 400 is subdivided into time-slots (where which channels are allocated to which time-slots is controlled separately for each media access control frame 400).

Now, at the radio base station 100, the slot scheduling unit 103 allocates a time-slot to each channel according to given rules.

The control information transmission and reception unit 102 carries out encoding or the like of information to be transmitted by the first broadcast channel 401, the frame control channel 402, the second broadcast channel 406, the individual control channel 408, and the datalink control channel 410, and commands the radio interface 101 to transmit them using time-slots allocated by the slot scheduling unit 103. Also, the control information transmission and reception unit 102 decodes information contained in time-slots corresponding to the individual control channel 411 and the datalink control channel 413 that is received from the radio interface 101.

The user information transmission and reception unit 105 carries out encoding or the like of information to be transmitted by the user data channel 409, and commands the radio interface 101 to transmit it using a time-slot allocated by the slot scheduling unit 103. Also, the user information transmission and reception unit 105 decodes information contained in a time-slot corresponding to the user data channel 412 that is received from the radio interface 101.

The radio interface 101 realizes functions such as radio transmission and reception, modulation and demodulation, etc.

The relay unit 106 corresponds to a bridge function or a router function, and receives data that are either received by the wire interface 107 or the radio interface 101, or generated in the radio base station 100. In addition, the relay unit 106 determine whether the data are to be transmitted to the wire interface 107 or the radio interface 101, or received by this radio base station 100 itself, by referring to an internal routing information, and carries out the control such that the data will be given to the determined destination.

Figures 3, 4:
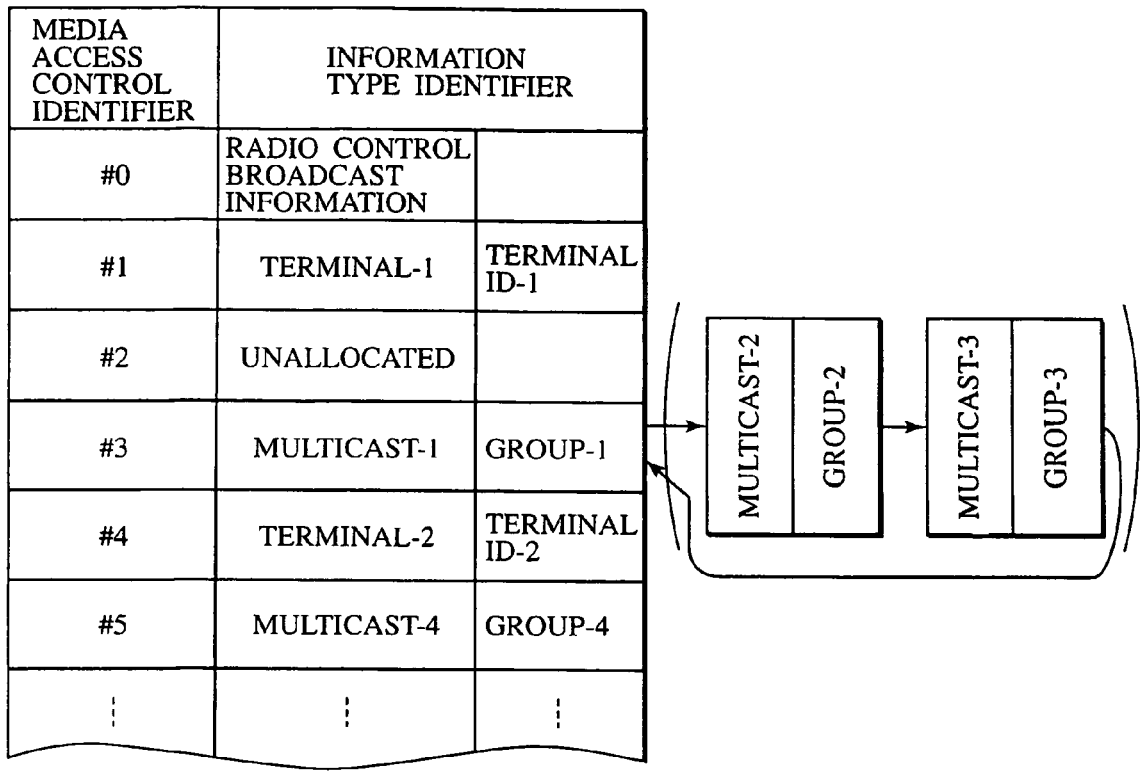
FIG. 3 is a diagram showing one example of a correspondence table in a media access control identifier management unit of the radio base station in the radio communication system of FIG. 1.
FIG. 4 is a diagram showing one example of a correspondence table in a media access control identifier management unit of the radio terminal in the radio communication system of FIG. 1.

The media access control identifier management unit 104 manages correspondences between information type identifiers and media access control identifiers, using a correspondence table as shown in FIG. 3.

In the example of FIG. 3, the information type identifier is divided into two parts, where one part (a left column of the information type identifier in FIG. 3) is labelled by names such as "terminal-1", "terminal-2", "multicast-1", "multicast-2", "multicast-3", and "multicast-4", for example.

These can be network layer address (IP address or the like to be specific) of the radio terminal 200, the multicast address of the network layer, or information types at the radio control level which is the lower layer, for example.

Also, the other part of the information type identifier (a right column of the information type identifier of FIG. 3) is labelled by names such as "terminal ID-1", "terminal ID-2", "group ID-1", "group ID-2", "group ID-3", and "group ID-4", for example. These indicate an ID number uniquely assigned to the radio terminal 200 or an ID number uniquely assigned to the multicast group. Depending on the system, it is possible to set up two or more connections with respect to one terminal ID, and in such a case the same terminal ID may have two or more media access control identifiers. The group ID may indicate open media information such as "news A" or "advertisement B", for example, or a CUG (Closed User Group) ID such as "mailing list C". The group ID is usually unique over all the radio base stations with which the radio terminal 200 is capable of carrying out communications, but if this is not the case, there is a need to provide some way of notifying information regarding the change of the group ID to the radio terminal 200.

The correspondences between the information type identifiers and the media access control identifiers may be changed in time. For example, FIG. 3 shows that the media access control identifier "#3" currently corresponds to "multicast-1" and "group ID-1" but it can also correspond to "multicast-2" and "group ID-2", or "multicast-3" and "group ID-3" at other moments. The correspondence can be changed according a prescribed rule such as that for cyclically changing the correspondence among these three whenever the radio base station 100 transmits the media access control frame 400, for example.

The media access control identifier management unit 104 selects the specific correspondence between the information type identifier and the media access control identifier at appropriate frequency, and requests the control information transmission and reception unit 102 to transmit the selected correspondence using the second broadcast channel 406. In the above described example, transmission of the information type identifier (multicast-1, multicast-2, or multicast-3) corresponding to the media access control identifier "#3" using the second broadcast channel 406 of the media access control frame 400 at a time when the correspondence is changed will be requested. At this point, especially in the case of the multicast address, there can be cases where the information type identifier given by information of an address on the left column alone is insufficient for the receiving radio terminal 200 side to ascertain what information it is. In such cases, information of the group ID on the right column is also transmitted at the same time. The media access control identifier management unit 104 also requests transmission of the information type identifier for which the corresponding media access control identifier is lost, according to the need. The correspondence to be selected at appropriate frequency can be fixed one instead of the time varying one. However, the media access control identifier "#0" is allocated in advance to the radio control broadcast information, so that there is no need to broadcast this correspondence.

Upon receiving this request, the control information transmission and reception unit 102 requests the slot scheduling unit 103 to allocate as many time-slots as required in transmitting that correspondence (any other information to be transmitted will also be included in the required amount) to the second broadcast channel 406 in the media access control frame 400. The control information transmission and reception unit 102 mounts that correspondence into the allocated time-slots and transmit it through the radio interface 101.

Next, at the radio terminal 200, the radio interface 201 realizes functions such as radio transmission and reception, modulation and demodulation, etc. More specifically, the radio interface 201 receives the first broadcast channel 401, the frame control channel 402, as well as the second broadcast channel 406, the individual control channel 408 destined to the own terminal, the user data channel 409 destined to the own terminal and the datalink control channel 410 among the downlink channel 403, in the media access control frame 400. Also, the radio interface 201 transmits necessary information to the random access channel 404, the individual control channel 411 for the own terminal, the user data channel 412 for the own terminal, and the datalink control channel 413. Here, the channel destined to the own terminal can be a channel destined to a plurality of terminals that include the own terminal.

The user information transmission and reception unit 203 gives the user information to be transmitted at the user data channel 412 for the own terminal, to the radio interface 201, and receives the user information that was received as destined to the own terminal from the radio interface 201.

The control information transmission and reception unit 202 carries out the control information exchange with the radio interface 201, and then gives information on the correspondence between the information type identifier and the media access control identifier to the media access control identifier management unit 204 when such a correspondence information is contained in the second broadcast channel 406 received through the radio interface 201.

The media access control identifier management unit 204 is managing information on the information type identifier to be received by the radio terminal 200 using a correspondence table as shown in FIG. 4. The media access control identifier management unit 204 selects only those correspondences that are related to the information type identifier to be received by the radio terminal 200 from the obtained information on the correspondence between the information type identifiers and the media access control identifiers, and registers the media access control identifiers corresponding to the selected correspondences into the correspondence table of FIG. 4. In this example, it is assumed that a set of "multicast-3" and "group-3" is registered in advance as the information type identifier to be received, so that the media access control identifier "#3" that corresponds to it will be registered. If the value of "multicast-3" is apparently fixed one, there is no need for the radio terminal to maintain "group-3" part which is the right side of the information type identifier, but the value of "multicast-3" may take different values depending on time and place in general.

In the case where it is indicated that there is no media access control identifier corresponding to the information type identifier, the media access control identifier is deleted. For example, when it is indicated that the media access control identifier corresponding to "multicast-3" is lost after awhile, the media access control identifier column corresponding to "multicast-3" will be set as unallocated. However, the information type identifier itself will be left as it indicates the information type to be received by the radio terminal 200. Note that the media access control identifier of the own terminal is set as unallocated to indicate that the radio base station 100 is not particularly aware of the existence of this radio terminal.

The media access control identifier management unit 204 notifies the media access control identifier for which the need for receiving arose and the media access control identifier for which the need for receiving disappeared, to the slot selection unit 205.

The slot selection unit 205 notifies this change to the radio interface 201, such that the radio interface 201 will determine portions to be transmitted or received according to this information.

The processing up to this point constitutes the method for broadcasting the media access control identifier corresponding to the information type to be received, from the radio base station 100 to the radio terminal 200.

In the following, the processing procedure for conveying the user data up to the radio terminal 200 in the case where the radio base station 100 actually receives the user data destined to the information type to be received. This processing procedure is slightly different for the case of point-to-point and the case of point-to-multipoint so that these two cases will be described separately.

Figure 5:
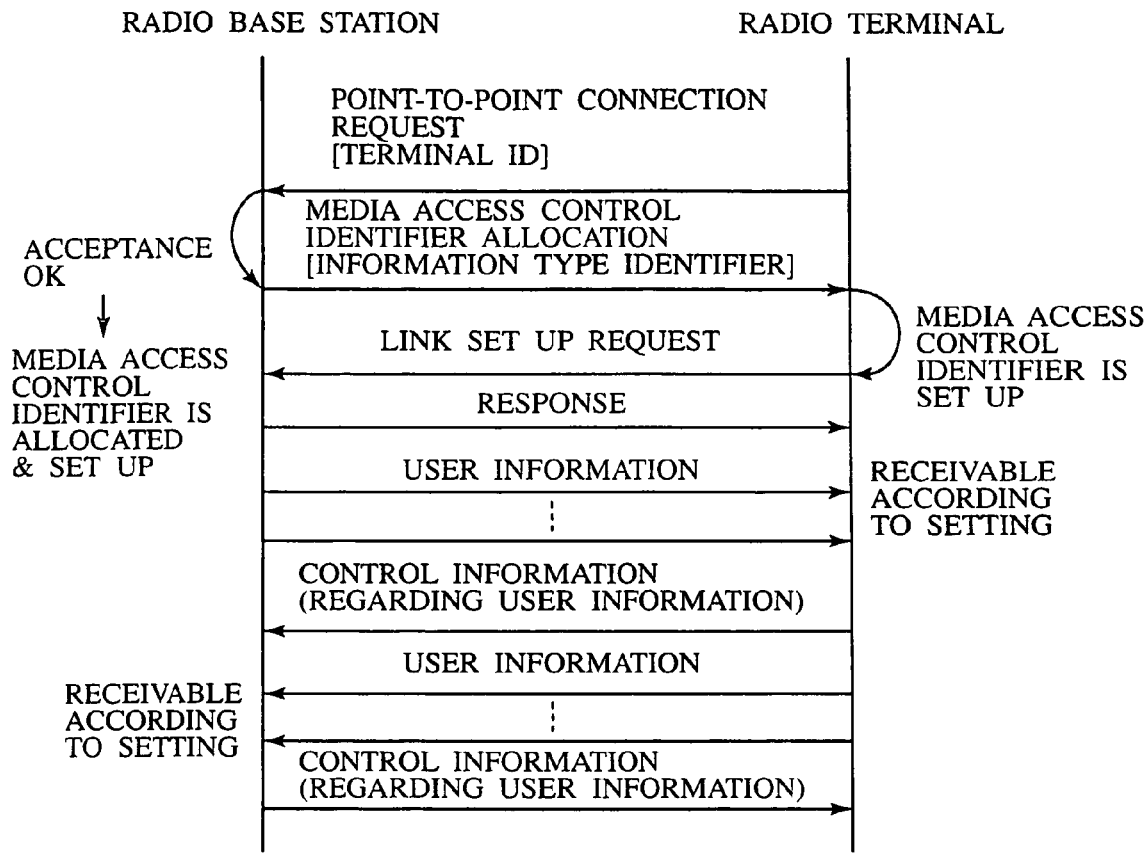
FIG. 5 is a sequence chart showing an exemplary point-to-point link connection procedure in the radio communication system of FIG. 1.

First, the case of point-to-point will be described. FIG. 5 shows the exemplary procedure in the case of point-to-point.

The radio terminal 200 recognizes the existence of the radio base station 100 by receiving the first broadcast channel 401 transmitted by the radio base station 100, and the media access control identifier and the information type identifier are dynamically set in correspondence by establishing association with the radio base station 100.

More specifically, the radio terminal 200 first transmits a point-to-point radio channel connection request message toward the radio base station 100 using the random access channel 404. This connection request message contains at least the terminal ID which is the information type identifier.

When this connection is possible, the media access control identifier management unit 104 of the radio base station 100 creates the correspondence table for the information type identifier in the connection request message and the unused media access control identifier corresponding to it. Now, if the information type identifier is "terminal ID-3" as shown in FIG. 4, the media access control identifier "#6" is defined in correspondence to it in FIG. 3, for example.

The radio base station 100 returns a set of the information type identifier and the media access control identifier as a response message to that connection request message, using the second broadcast channel 406.

Upon receiving this response message, the radio terminal 200 registers that media access control identifier into the table in the media access control identifier management unit 204.

Next, the radio base station 100 sets up a point-to-point control channel with respect to the radio terminal 200. This control channel comprises the individual control channel 408 and the individual control channel 411, and the setting for ensuring the connectivity in the network layer level is made here. If information on the left column of the information type identifier (such as "terminal-3" for example) is not contained in the connection request message, the setting of that value is made at this stage.

Utilizing the individual control channel 408 and the individual control channel 410 that are set up in this way, it is possible to set up the datalink connection by a request from either the radio terminal 200 or the radio base station 100. The user information is usually transmitted through this datalink connection. In other words, the channels utilized by the datalink connection are the user data channel 409 and the user data channel 412. At the same time, a datalink control connection to be used in carrying out the exchange of ARQ (Automatic Repeat Request) information with respect to the user information is set up in conjunction with the datalink connection. The channels utilized by this datalink control connection are the datalink control channel 410 and the datalink control channel 413. In general, it is possible to set up a plurality of datalink connections between one radio terminal 200 and the radio base station 100, so that each datalink connection has a datalink connection identifier which is unique with respect to a given media access control identifier. There are cases where information on this datalink connection identifier is added to information on a set of the media access control identifiers and the time-slot position relationship that is broadcast by the frame control channel 402. Note that what is described here also apply to the other procedures described below.

Now, when the radio base station 100 receives data through the wire interface 107 at this point, the data are given to the relay unit 106.

The relay unit 106 inquires to the media access control identifier management unit 104 about the media access control identifier corresponding to the information type identifier that either directly or indirectly indicates the destination of that data. When this happens to be information equivalent to destined to "terminal-3", the media access control identifier "#6" will be obtained from FIG. 3 (which is additionally registered as described above even though it is not shown in FIG. 3). The relay unit 106 requests the user information transmission and reception unit 105 to transmit that data using the time-slot corresponding to the media access control identifier "#6" so obtained.

The user information transmission and reception unit 105 requests the slot scheduling unit 103 to allocate the time-slot corresponding to the media access control identifier "#6".

The slot scheduling unit 103 allocates the time-slot corresponding to the media access control identifier "#6", and also requests the control information transmission and reception unit 102 to transmit this correspondence using the frame control channel 402. At the same time, the slot scheduling unit 103 also notifies the time-slot allocated to the media access control identifier "#6" to the user information transmission and reception unit 105.

The user information transmission and reception unit 105 transmits the data whose transmission is requested by the relay unit 106, using the time-slot allocated by the slot scheduling unit 103. For this transmission, the user data channel 409 is used.

When the control information transmission and reception unit 202 of the radio terminal 200 receives the frame control channel 402 through the radio interface 201, information contained in it is given to the slot selection unit 205.

The slot selection unit 205 determines the time-slot to be received from a combination of that information and information regarding the media access control identifier to be received that is obtained by inquiring to the media access control identifier management unit 204, and commands the radio interface 201 to receive that time-slot.

In accordance with this command, the radio interface 201 receives the data transmitted by the user information transmission and reception unit 105, and gives the received user information portion to the user information transmission and reception unit 203.

Note that, usually, in the case of point-to-point, the uplink channels from the radio terminal 200 to the radio base station 100 are also set up. Namely, in the case where the user information is to be transmitted from the radio terminal 200, the frame control channel 402 received at the radio interface 201 is sent to the slot selection unit 205 via the control information transmission and reception unit 202. Then, the slot selection unit 205 commands the timing for transmission to the user information transmission and reception unit 203, and the user information transmission and reception unit 203 sends that user information to the radio interface 201. This user information is then transmitted using the uplink user data channel 412.

Note also that what is to be transmitted from the user information transmission and reception unit 203 includes not just the user information but also an ARQ message with respect to the received user information. A procedure for transmitting this ARQ message is exactly the same as a procedure for transmitting the user information described above, but the datalink control channel 413 will be used for this. Similarly, the datalink control channel 410 will be used for the ARQ message with respect to the uplink user information.

Next, the case of point-to-multipoint will be described.

In this embodiment, it is assumed that ID of the multicast information to be received by the radio terminal 200 is set in advance in the radio terminal 200 itself. Also, the media access control identifier management unit 104 of the radio base station 100 creates in advance a correspondence table for the multicast information type identifier and the media access control identifier corresponding to it as shown in FIG. 3.

The radio base station 100 regularly broadcasts a set of the information type identifier and the media access control identifier using the second broadcast channel 406 as described above.

Upon receiving this, the radio terminal 200 registers the media access control identifier into the table in the media access control identifier management unit 204 as shown in FIG. 4.

The handling from this point on can take one of the following two forms depending on the characteristic of the multicast traffic.

The first form is a form in which the point-to-multipoint traffic is unidirectional from the radio base station 100 to a plurality of radio terminals, so that the traffic from the radio terminal 200 contains no user information and no ARQ information, and there is no need to adjust parameters with respect to this unidirectional traffic in advance. Namely, it is either the case where the radio terminal 200 already knows the traffic parameters as known ones at a stage where the radio terminal 200 knows the multicast information type identifier, or the case where the radio terminal 200 can accept the traffic of the user information using that information type identifier no matter what it is. This form will be referred to as the "broadcast type multicast".

Figure 6:
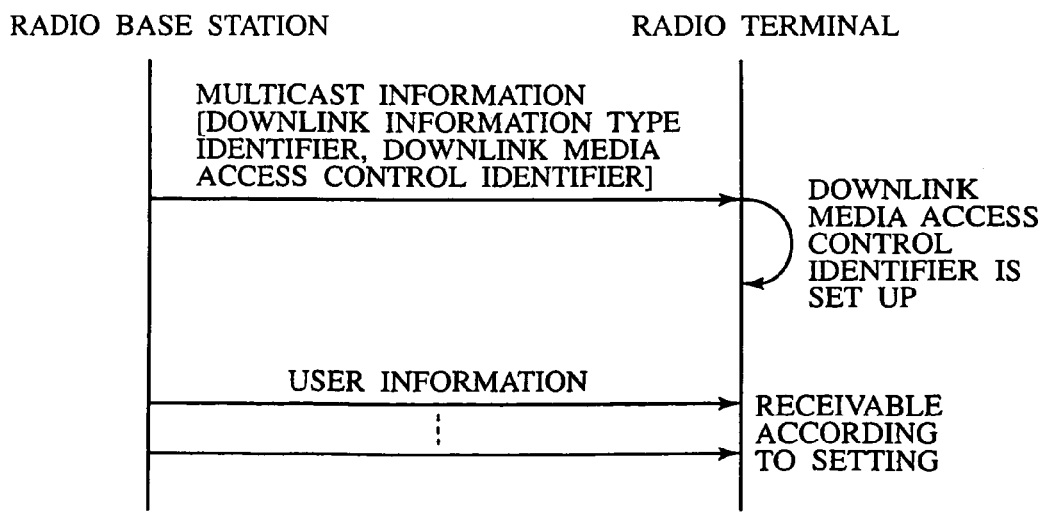
FIG. 6 is a sequence chart showing an exemplary broadcast type multicast link connection procedure in the radio communication system of FIG. 1.

In this embodiment, in the case of the broadcast type multicast, there is no need for the radio base station 100 to care which radio terminals will be actually receiving this traffic. Also, there is no need for the uplink ARQ information or user information, so that it will be a service without a confirmation as to whether the user information has reached or not with respect to the radio terminal 200. Also, there is no need for the radio terminal 200 side to initiate any action with respect to the radio base station 100. FIG. 6 shows the exemplary procedure in this case.

Note that, as shown in FIG. 6, the set up of the datalink connection and the datalink control connection associated with it can be omitted in the case where the uplink ARQ information with respect to the downlink multicast user information transmission is unnecessary. However, the datalink connection identifier can be utilized without requiring an explicit set up of the datalink connection and the datalink control connection. These points also apply to the other procedure for the broadcast type multicast described below. An example in which the datalink connection identifier is utilized for the purpose of multiplexing the user information will be described later as the fifth embodiment.

The second form is a form in which the point-to-multipoint traffic is unidirectional from the radio base station 100 to a plurality of radio terminals, but there is a need to return the user information and/or the ARQ information in response to it from the radio terminal 200. This form will be referred to as "bidirectional type multicast".

Figure 7:
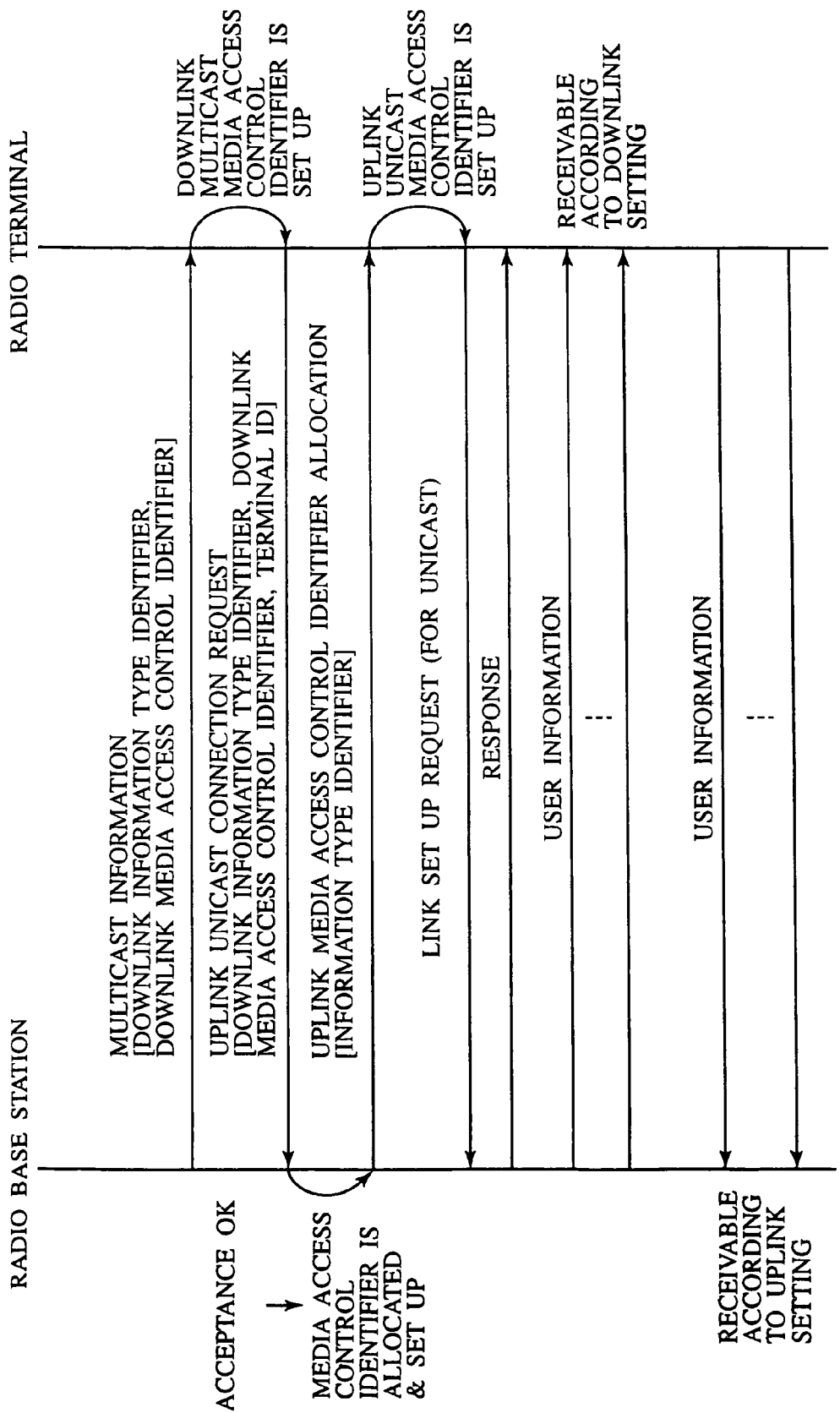
FIG. 7 is a sequence chart showing an exemplary bidirectional type multicast link connection procedure in the radio communication system of FIG. 1.

In this embodiment, in the case of the bidirectional type multicast, there is a need to transmit the uplink unicast connection request message for the multicast traffic from the radio terminal 200 to the radio base station 100 using the random access channel 404, similarly as in the case of point-to-point. Such a connection request message regarding the multicast is created by the multicast control unit 206, given to the control information transmission and reception unit 202, and transmitted from there through the radio interface 201. As a result, the individual control channel 408 and the individual control channel 411 are set up. In the case where there is a need to transmit only the ARQ information, it is necessary to set up the datalink control channel 410 and the datalink control channel 413 in addition to them. Also, in the case where there is a need to transmit the user information on the uplink side, it is necessary to set up the user data channel 409 and the user data channel 412 in addition to the datalink control channel 410 and the datalink control channel 413. Here, however, there can be cases where the set up of the downlink user data channel 409 is omitted as it is not used. The set up of these channels is carried out by the procedure similar to that in the case of point-to-point. Note however that this set up can takes place either before or after the notification of the point-to-multipoint media access control identifier. FIG. 7 shows the exemplary procedure in the case of carrying out the set up after the notification.

Here, in FIG. 7, in the case where there is a need for the uplink ARQ information with respect to the downlink multicast user information, the datalink connection and the datalink control connection associated with it for the multicast are set up. The datalink control connection for the multicast is set up either individually using the datalink control channel 413 with respect to a plurality of radio terminals, or using the random access channel 404.

In the former case, there is a need to allocate the media access control identifiers separately to the datalink control channels for different radio terminals. Otherwise, each radio terminal cannot distinguish the time-slot allocated to the own radio terminal from those of the other radio terminals from the information contained in the frame control channel 402. There is a possibility for a collision to occur as a plurality of radio terminals attempt to use the same time-slot simultaneously. The media access control identifier to be allocated can be the same as that allocated to the radio terminal 200 for the point-to-point in the case where there is no downlink point-to-point user information, but it is preferable to allocate another media access control identifier in the case where there is a downlink point-to-point user information. Otherwise, the radio base station 100 will require a separate method for distinguishing whether it is the ARQ information regarding the downlink multicast user information or the ARQ information regarding the downlink point-to-point user information. Alternatively, a management method in which the datalink connection identifier becomes unique for the downlink multicast user information and the downlink point-to-point user information is also possible. In either case, the radio base station 100 and the radio terminal 200 have a function for managing the correspondence between the media access control identifier for the uplink datalink control channel with respect to the downlink multicast and the media access control identifier for the downlink multicast.

In the latter case of using the random access channel 404, the media access control identifier for the multicast can be used for the datalink control channel. The random access channel 404 is set up from the beginning on an assumption that the time-slots will be commonly used by a plurality of radio terminals, so that it usually has a function for resolving collisions, although it will not be described in detail here.

The above noted points also apply to the other procedure for the bidirectional type multicast described below.

Now, in the following, the above described procedure for managing correspondence between the media access control identifier for the uplink datalink control channel and the media access control identifier for the downlink multicast will be described in further detail for a case where the radio terminal 200 requests a set up of the datalink control connection for the downlink multicast.

Figure 8:
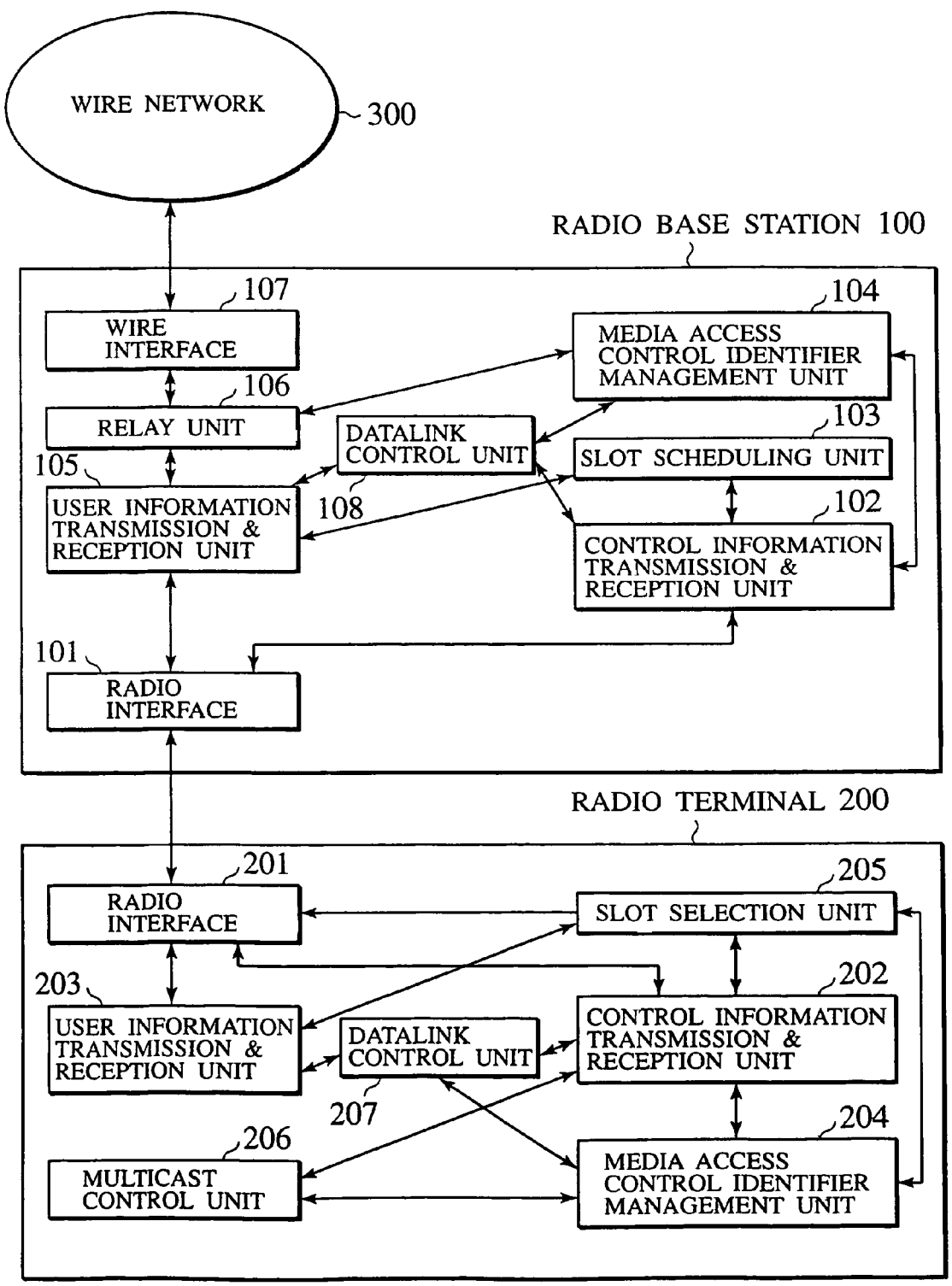
FIG. 8 is a block diagram showing another exemplary configuration of the radio base station and the radio terminal in a radio communication system according to the first embodiment of the present invention.

FIG. 8 shows an exemplary configuration of the radio base station 100 and the radio terminal 200 in this case. The radio base station of FIG. 8 has a datalink control unit 108 added to the radio base station of FIG. 1, and the radio terminal of FIG. 8 has a datalink control unit 207 added to the radio terminal of FIG. 1.

In the procedure of FIG. 7, there is no downlink point-to-point user information, but it may possibly be set up and used afterward. For this reason, the uplink datalink control channel 413 will be allocated to the downlink multicast user information and the downlink point-to-point user information from the beginning such that the radio base station 100 side can identify it by the media access control identifier. In other words, it is allocated with _a media access control identifier different from that allocated by the media access control identifier allocation for the uplink in FIG. 7.

The datalink control unit 207 issues a request for setting up the datalink control connection for the downlink multicast, This request contains "terminal-3" and the downlink multicast media access control identifier "#3".

Upon receiving this request, the control information transmission and reception unit 202 requests the radio interface 201 to transmit this request using the uplink individual control channel 411.

The radio interface 201 transmits this request by utilizing the time-slot which is indicated as corresponding to the individual control channel 411 by the slot selection unit 205.

This request is given to the datalink control unit 108 via the radio interface 101 and the control information transmission and reception unit 102.

The datalink control unit 108 recognizes that it is a datalink connection set up request from "terminal-3" with respect to the downlink multicast of the media access control identifier "#3", and requests the media access control identifier management unit 104 to allocate an uplink datalink control media access control identifier with respect to this.

The media access control identifier management unit 104 allocates an unallocated media access control identifier, say "#9" for example, to the information type identifier of the datalink control information from "terminal-3" with respect to the media access control identifier "#3" (or "multicast-1"). As a result, the correspondence table of the media access control identifier management unit 104 becomes as shown in FIG. 9.

The datalink control unit 108 includes the allocated media access control identifier "#9", "terminal-3", and the downlink multicast media access control identifier "#3" in the datalink connection set up response.

This response is transmitted using the individual control channel 408 destined to the radio terminal 200 which is allocated by the slow scheduling unit 103, via the control information transmission and reception unit 102 and the radio interface 101.

The datalink control unit 207 receives this response via the radio interface 201 and the control information transmission and reception unit 202, and requests the media access control identifier management unit 204 to store a correspondence between the information type identifier of the datalink control information with respect to the media access control identifier "#3" (or "multicast-1") and the media access control identifier "#9". As a result, the correspondence table of the media access control identifier management unit 204 becomes as shown in FIG. 10.

Note that, in the case of the downlink multicast, the datalink control unit 207 can be operated according to an interpretation that the datalink connection corresponding to the datalink connection identifier associated with the incoming user information is already set up.

The datalink control unit 207 transmits information such as a failure to receive a sequence number "#X" of the datalink connection identifier "#1" (NACK) using the datalink control channel 410 that was set up. At this point, the media access control identifier corresponding to information that was not received and the media access control identifier corresponding to the datalink control channel are different, so that there is a need to make a correspondence between them according to information of FIG. 10 by inquiring to the media access control identifier management unit 204.

The datalink control unit 108 controls the user information transmission and reception unit 105 to re-transmit the lost user information.

Next, a procedure of a management such that the datalink connection identifier becomes unique for the downlink multicast user information and the downlink point-to-point user information will be described in further detail for a case where the radio terminal 200 requests a set up of the datalink control connection for the downlink multicast.

In this case, the configuration of the radio base station 100 and the radio terminal 200 is the same as that of FIG. 8.

In the procedure of FIG. 7, there is no downlink point-to-point user information, but it is assumed to be set up and used afterward. For this reason, the uplink datalink control information will be allocated to the downlink multicast user information and the downlink point-to-point user information such that the radio base station 100 side can identify it by the datalink connection identifier. The datalink control connection is identical for the downlink multicast user information and the uplink/downlink point-to-point, and has the same media access control identifier ("#8" with respect to "terminal-3" for example).

The datalink control unit 108 is assumed to be managing the datalink connection identifier as shown in FIG. 11. A target media access control identifier column registers the media access control identifier of the user data channel to which a datalink control target datalink connection will be multiplexed, a control information media access control identifier column registers the media access control identifier of a datalink control channel to be used for that control (which will be provided at least as many as the number of receiving terminals in the case of the datalink connection identifier for the multicast, but which will be left blank in the case of not carrying out the datalink control), and a datalink connection identifier column registers the datalink connection identifiers for identifying a plurality of datalink connections to be multiplexed to the above noted user data channel. In an example of FIG. 11, it is assumed that the unicast media access control identifier "#1" is allocated to "terminal-1" and the unicast media access control identifier "#8" is allocated to "terminal-3".

At a time of start transmitting new downlink multicast user information, the datalink control unit 108 searches through the target media access control identifier column using the media access control identifier "#3" allocated to that multicast as a key, to obtain a record (information given by a set of the target media access control identifier, the control information media access control identifier and the datalink connection identifier) for that multicast. Then, the already used datalink connection identifiers are obtained from the datalink connection identifier information in the record for that multicast, and removed from the new allocation target. For example, if "#2" is already used, "#2" is removed.

In addition, the datalink control unit 108 obtains the control information media access control identifier from the record for that multicast, and searches through the target media access control identifier column again using these "#1" and "#8" to obtain the record for the unicast this time. Here it is assumed that values of the unicast media access control identifiers for terminals that receive that multicast are set in the control information media access control identifier column. Then, the already used datalink connection identifiers are obtained from the datalink connection identifier information in the record for that unicast, and removed from the new allocation target. Namely, "#0" and "#1" are removed.

An appropriate value, say "#3", is selected from a space of numbers available for allocation that have survived up to this point, and allocated as the datalink connection identifier for that multicast. Then, a record consisting of a set of the target media access control identifier "#3", the control information media access control identifiers "#1" and "#8", and the datalink connection identifier "#3" is added to the management table. The value of this datalink connection identifier will be attached to the user information to be transmitted by that multicast, as the control information.

Note that it is possible to omit the above described procedure regarding the search of the record for the unicast by separating in advance the datalink connection identifier number spaces for the multicast and for the unicast.

The correspondence among the media access control identifier, the newly allocated datalink connection identifier and the information type identifier for the multicast is notified by a method to be described in the fifth embodiment for example. The datalink control unit 207 receives this notification and adds a record consisting of a set of the target media access control identifier "3", the control information media access control identifier "#8", and the datalink connection identifier "#3", to the management table shown in FIG. 12. The target media access control identifier "#3" and the datalink connection identifier "#3" are contained in the broadcast information to be described in the fifth embodiment. The control information media access control identifier "#8" is a value already given for the own unicast. In this way, the radio terminal 200 becomes capable of using the datalink control channel 410.

The datalink control unit 207 transmits information such as a failure to receive a sequence number "#X" of the datalink connection identifier "#1" (NACK) for "multicast-1" using the datalink control channel 410 that was set up. At this point, the media access control identifier corresponding to information that was not received and the media access control identifier corresponding to the datalink control channel are different, so that the media access control identifier for the own terminal (unicast) is ascertained by inquiring to the media access control identifier management unit 204, and the datalink control channel 410 corresponding to that media access control identifier is used.

The datalink control unit 108 controls the user information transmission and reception unit 105 to re-transmit the lost user information.

In either one of the above described cases, the following operations are common.

Namely, when the radio base station 100 receives data through the wire interface 107, this data is given to the relay unit 106.

The relay unit 106 inquires the media access control identifier management unit 104 about the media access control identifier corresponding to the information type identifier that directly or indirectly indicates the destination of that data. Here, it is assumed that the information type identifier is "multicast-3". Then, the media access control identifier "#3" is obtained. The relay unit 106 requests the user information transmission and reception unit 105 to transmit that data using the time-slot corresponding to the media access control identifier "#3" so obtained.

The user information transmission and reception unit 105 requests the slot scheduling unit 103 to allocate the time-slot corresponding to the media access control identifier "#3".

The slot scheduling unit 103 allocates the time-slot corresponding to the media access control identifier "#3", and requests the control information transmission and reception unit 102 to transmit this correspondence using the frame control channel 402. At the same time, the slot scheduling unit 103 notifies the time-slot allocated to the media access control identifier "#3" to the user information transmission and reception unit 105.

The user information transmission and reception unit 105 transmits the data whose transmission is requested by the relay unit 106, using the time-slot allocated by the slot scheduling unit 103.

When the control information transmission and reception unit 202 of the radio terminal 200 receives the frame control channel 402 through the radio interface 201, the information contained in it is given to the slot selection unit 205.

The slot selection unit 205 determines the time-slot to be received from a combination of that information and the information regarding the media access control identifier to be received that is obtained by inquiring to the media access control identifier management unit 204, and commands the radio interface 201 to received that time-slot.

According to this command, the radio interface 201 receives the data transmitted by the user information transmission and reception unit 105, and gives it to the user information transmission and reception unit 203.

Referring now to FIG. 13 to FIG. 16, the second embodiment of a radio communication system according to the present invention will be described in detail.

The second embodiment is similar to the first embodiment as far as the handling of the point-to-point is concerned, but a way of realizing the point-to-multipoint is different. In the following, the differences from the first embodiment will be mainly described.

The media access control identifier management unit 104 of the radio base station 100 and the media access control identifier management unit 204 of the radio terminal 200 are similar to those of FIG. 3 and FIG. 4, but unlike the first embodiment, the correspondence between the multicast media access control identifier and the information type identifier is not notified to all the radio terminals located in that area. Namely, there is provided an information regarding which radio terminals are actually requiring the information on the correspondence, and the information on the media access control identifier is given by way of a message destined to such a radio terminal. However, because it is the point-to-multipoint communications, the media access control identifier allocated by the radio base station 100 with respect to the same multicast communication transmission request from a plurality of radio terminals will be identical.

There are following two methods for comprehending radio terminals that will receive the multicast, for example.

(1) A method in which those radio terminals that wish to receive a certain multicast communication (broadcasting, for example) are to make a request for the notification of the media access control identifier for the purpose of that multicast communication to the radio base station 100.

(2) A method in which a correspondence table of an ID of each radio terminal 200 and the information type identifiers of the multicasts that each radio terminal 200 wishes to receive is provided at the radio base station 100 side (or at a server within a wire network 300 located beyond that), and the radio base station 100 notifies values of the media access control identifiers for the required multicast communications from that table to that radio terminal 200 when that radio terminal 200 makes the location registration to the radio base station 100.

Moreover, there is a difference between the broadcast type multicast and the bidirectional type multicast similarly as in the first embodiment, in each one of these methods. In the following, examples of these four cases will be described one by one.

First, the method (1) in the broadcast type multicast will be described. FIG. 13 shows the exemplary procedure in this case.

The radio terminal 200 creates the downlink multicast connection request message containing "terminal ID" and the information type identifiers of "multicast-3" and "group ID-3" at the multicast control unit 206, and this message is transmitted to the radio base station 100 via the control information transmission and reception unit 202 and the radio interface 201.

Upon receiving this connection request message using the random access channel 404, the radio base station 100 broadcasts a message indicating that a specific terminal ID is set as the destination, and a pair of the received information type identifier and the media access control identifier corresponding to that information type identifier which is allocated by the media access control identifier management unit 104, using the second broadcast channel 406.

Although the same broadcast channel is used, in contrast to the first embodiment where the information reception and the content comprehension are requested to all the radio terminals, this embodiment differs in that the channel destined to the specific radio terminal is sent so that radio terminals other than the corresponding one will receive the message but discard it without looking into its content.

After receiving the second broadcast channel 406 destined to the own terminal, the radio interface 201 of the radio terminal 200 gives its content to the media access control identifier management unit 204 via the control information transmission and reception unit 202. Then, the media access control identifier is registered into the table in a manner of FIG. 4, and its value is given to the slot selection unit 205.

Note that there can be cases where the radio terminal 200 has already established association with respect to the radio base station 100 for the point-to-point connection, by the method similar to that of FIG. 5 prior to the procedure of FIG. 13. In such cases, the allocation of the multicast media access control identifier can be realized by utilizing the individual control channel 408 destined to that radio terminal 200, or the user data channel 409 destined to that radio terminal 200 depending on cases. The correspondence between the media access control identifiers and the time-slots allocated to these channels by the slot scheduling unit 103 is notified by the frame control channel 402, and the radio interface 201 of that radio terminal 200 receives the time-slot corresponding to the media access control identifier allocated to that radio terminal 200 according to the command of the slot selection unit 205. Note that this point is the same in the procedures to be described below with references to FIG. 14 to FIG. 16 and FIG. 26 to FIG. 28.

Note also that, in FIG. 13, the multicast connection request message and the multicast media access control identifier allocation message in FIG. 13 constitute one set of messages so that the correspondence between the multicast information type identifier and the media access control identifier is obvious to the radio terminal 200 even if the multicast information type identifier information is omitted in the multicast media access control identifier allocation message.

Although the above description presupposes that an appropriate pair of the information type identifier and the media access control identifier is registered in the table of the media access control identifier management unit 104 with respect to the connection request message from the radio terminal 200, there is no guarantee that such a pair always exists. Namely, such a pair may not exist in the table of the media access control identifier management unit 104 when signals of the multicast requested by the radio terminal 200 are not received from a server in the wire network 300 yet because there is no other radio terminal that has received them until then. In such a case, the radio base station 100 requests reception of these multicast signals with respect to the wire network 300 side. Also, the radio base station 100 registers a pair of a new multicast information type identifier and a new media access control identifier corresponding to it into the table of the media access control identifier management unit 104. A possibility for such a situation to arise is always present in the case where the radio terminal 200 issues the connection request message requesting reception of the multicast as in the bidirectional type multicast of the first embodiment, for example.

As another such case, there can be cases where the requested multicast signals were reaching to the wire interface 107 but these multicast signals were discarded because there has been no need for receiving them and relaying them to the radio interface 101 side, i.e., there has been no radio terminal that required these multicast signals. In such cases, reception of the multicast signals is started at the wire interface 107 and relaying to the radio interface 101 side is started through the relay unit 106. Note that the multicast signals may be discarded at a portion other than the wire interface 107 such as the relay unit 106 for example. Depending on the layer for realizing the relaying, the radio base station 100 is required to have a learning bridge or a switch in the case of the layer 2 relaying, a multicast router in the case of the layer 3 relaying, or a gateway function in the case of the higher level relaying.

Note that there is only one radio terminal 200 that receives the multicast in the above, and this situation can be handled either as the unicast case or as the multicast case depending on the system, but this embodiment is not limited to either way of handling.

Next, the method (2) in the broadcast type multicast will be described. FIG. 14 shows the exemplary procedure in this case.

When the radio terminal 200 makes the location registration, the radio base station 100 obtains information regarding the group ID of the multicast that radio terminal 200 should receive, from the table of the media access control identifier management unit 104 in the radio base station 100, or from a server in the wire network 300, or else from information communicated before moving in the case where that radio terminal 200 has moved from the other radio base station by the handover.

Then, when it is ascertained that this radio terminal 200 is requesting acquisition of the user information regarding the information type identifier of "multicast-3" and "group ID-3", the radio base station 100 broadcasts a message indicating that a specific terminal ID is set as the destination, and a pair of this information type identifier and the media access control identifier corresponding to that information type identifier which is allocated by the media access control identifier management unit 104, using the second broadcast channel 406.

After receiving the second broadcast channel 406 destined to the own terminal, the radio interface 201 of the radio terminal 200 gives its content to the media access control identifier management unit 204 via the control information transmission and reception unit 202. Then, the media access control identifier is registered into the table in a manner of FIG. 4, and its value is given to the slot selection unit 205.

Figure 15:
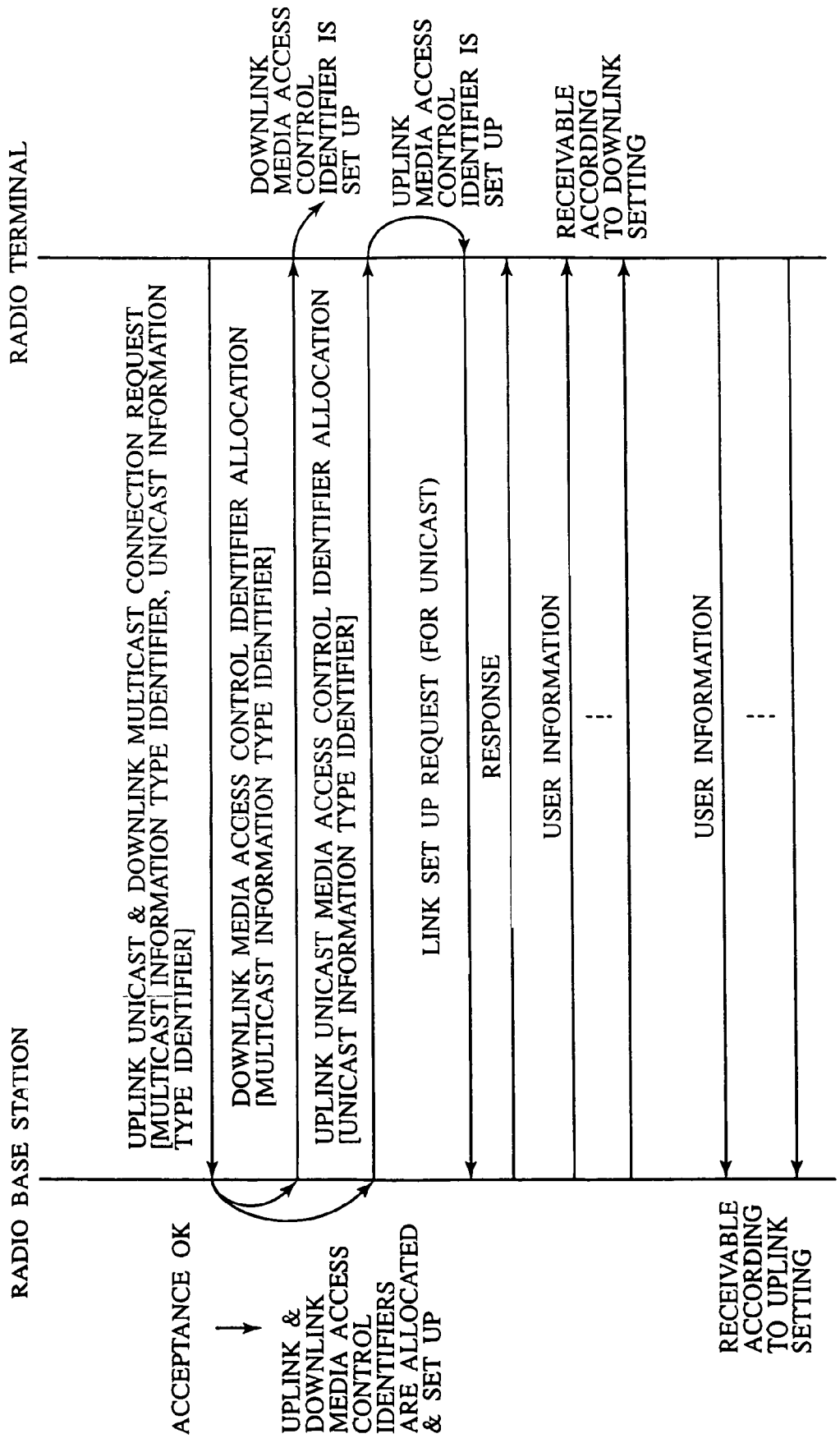
FIG. 15 is a sequence chart showing an exemplary bidirectional type multicast link connection procedure using a connection request from a radio terminal according to the second embodiment of the present invention.

Next, the method (1) in the bidirectional type multicast will be described. FIG. 15 shows the exemplary procedure in this case.

The radio terminal 200 sends the downlink multicast/uplink unicast connection request message containing both the information type identifiers of "multicast-3" and "group ID-3" and the information type identifier of the radio terminal 200, to the radio base station 100.

Upon receiving this connection request message using the random access channel 404, the radio base station 100 newly allocates the uplink unicast media access control identifier at the media access control identifier management unit 104. Then, the radio base station 100 broadcasts a message indicating that a specific terminal ID is set as the destination, and a pair of the received information type identifier and the media access control identifier corresponding to it, using the second broadcast channel 406, for each one of the downlink multicast and the uplink unicast.

As a result, the individual control channel 408 and the individual control channel 411 are set up for the uplink unicast. In the case where there is a need to transmit only the ARQ information, it is necessary to set up the datalink control channel 410 and the datalink control channel 413 in addition to them. Also, in the case where there is a need to transmit the user information on the uplink side, it is necessary to set up the user data channel 409 and the user data channel 412 in addition to the datalink control channel 410 and the datalink control channel 413. Note however that there can be cases where the downlink user data channel 409 is not set up as it will not be used. These settings are made by the procedure similar to the case of point-to-point.

After receiving the second broadcast channel 406 destined to the own terminal, the radio interface 201 of the radio terminal 200 gives its content to the media access control identifier management unit 204 via the control information transmission and reception unit 202. Then, two media access control identifiers are registered into the table in a manner of FIG. 4, and their values are given to the slot selection unit 205.

Note that this embodiment uses a message format for requesting both uplink and downlink connections simultaneously, but it is also possible to define them separately.

Figure 16:
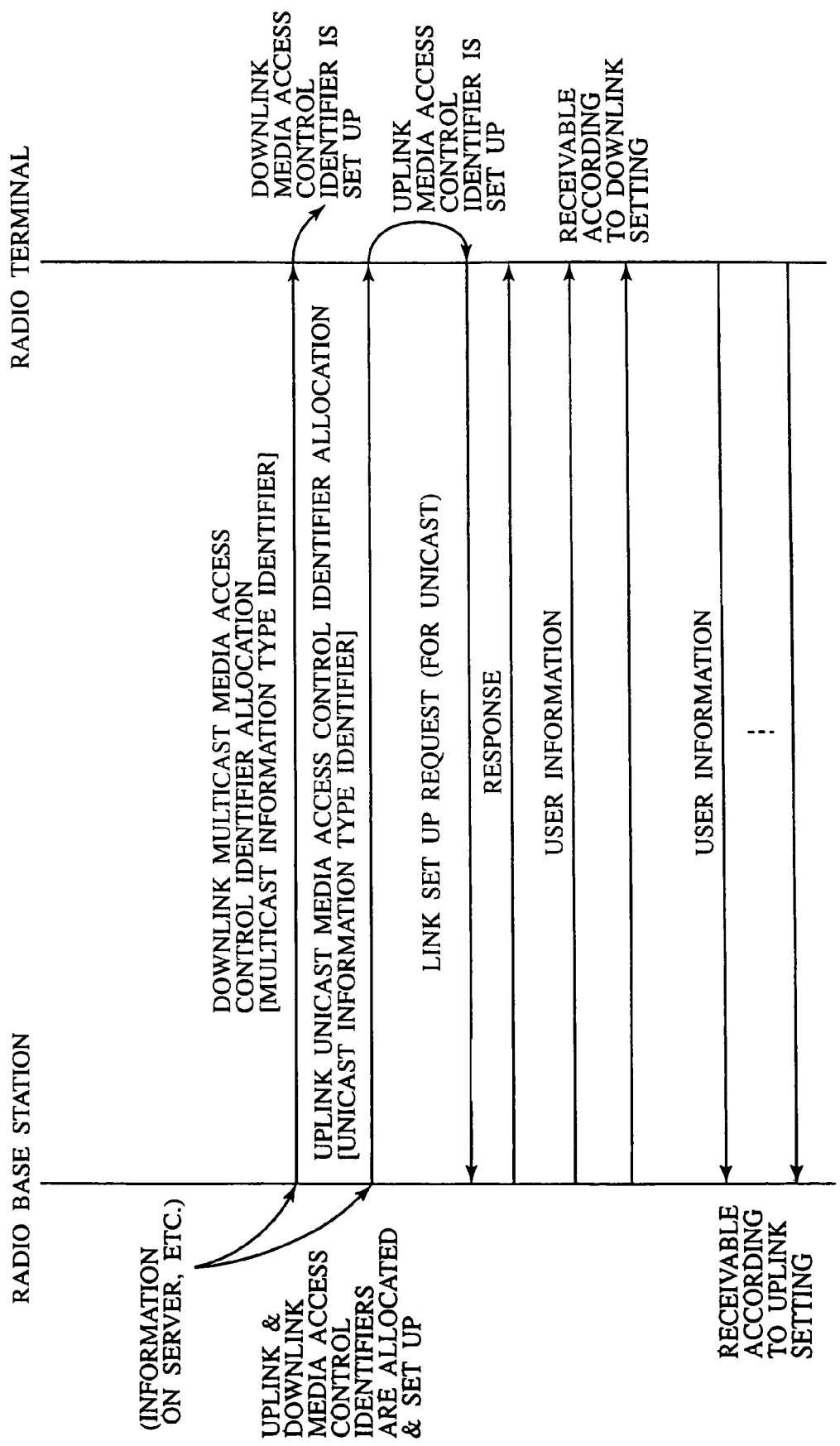
FIG. 16 is a sequence chart showing an exemplary bidirectional type multicast link connection procedure using a known radio terminal information according to the second embodiment of the present invention.

Next, the method (2) in the bidirectional type multicast will be described. FIG. 16 shows the exemplary procedure in this case.

When the radio terminal 200 makes the location registration, the radio base station 100 obtains information regarding the group ID of the multicast that radio terminal 200 should receive, from the table of the media access control identifier management unit 104 in the radio base station 100, or from a server in the wire network 300, or else from information communicated before moving in the case where that radio terminal 200 has moved from the other radio base station by the handover.

Then, when it is ascertained that this radio terminal 200 is requesting acquisition of the user information regarding the information type identifier of "multicast-3" and "group ID-3", the radio base station 100 broadcasts a message indicating that a specific terminal ID is set as the destination, a pair of the downlink multicast information type identifier and the media access control identifier corresponding to it, and a pair of the uplink unicast information type identifier and the media access control identifier corresponding to it, using the second broadcast channel 406.

After receiving the second broadcast channel 406 destined to the own terminal, the radio interface 201 of the radio terminal 200 gives its content to the media access control identifier management unit 204 via the control information transmiss (a direction from the radio terminal to all devices connected to the wire network such as the radio base station), and the bidirectional communications are realized by their combination. In the following, this scheme will be referred to as "hybrid scheme". Note that there can be a case where the uplink direction of the first radio communication path is implemented but simply not utilized and a case where it is not implemented to begin with. In the following, the latter case will be described in detail. It is also possible to utilize the second radio communication path in the downlink direction as well. In general, the first radio communication path and the second radio communication path adopt different radio schemes with different radio frequency, media access control scheme, etc.

The main difference between this embodiment and the above described embodiments is that communications in the uplink direction are carried out by the second radio communication path. Apart from this point, it is basically similar to the above described embodiments. Also this embodiment corresponds to the first embodiment among the above described embodiments.

Figure 23:
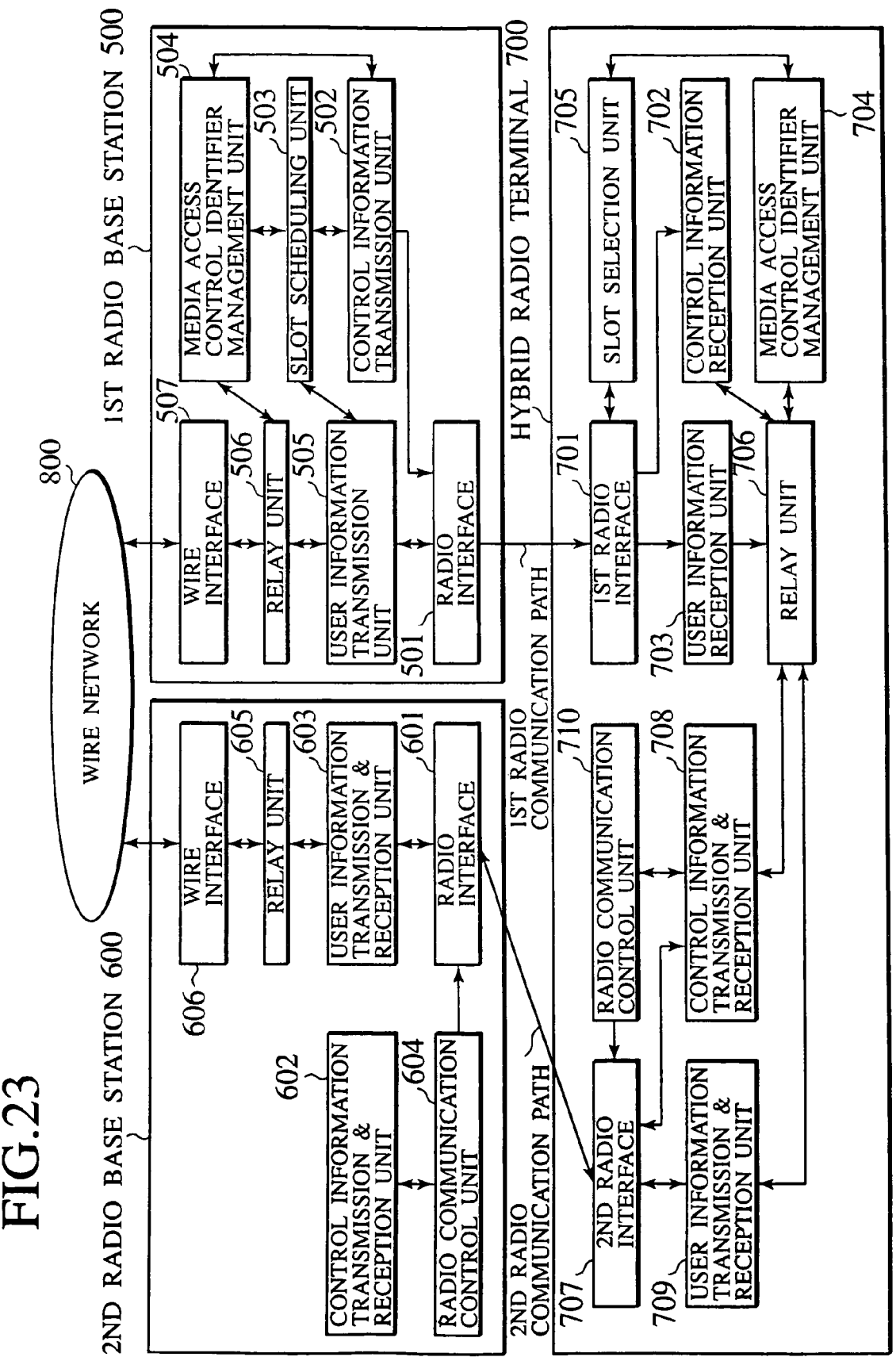
FIG. 23 is a block diagram showing an exemplary network configuration including a radio base station and a radio terminal of a radio communication system in a hybrid scheme according to the sixth embodiment of the present invention.

FIG. 23 shows an exemplary network configuration according to the hybrid scheme.

As shown in FIG. 23, this network according to the hybrid scheme comprises a first radio base station 500, a second radio base station 600, a hybrid radio terminal 700, and a wire network 800. The first radio communication path in the downlink direction is formed from the first radio base station 500 to the hybrid radio terminal 700, and the bidirectional second radio communication path is formed from the hybrid radio terminal 700 to the second radio base station 600. The bidirectional communications in the hybrid scheme are carried out by combining the first radio communication path in the downlink direction and the second radio communication path in the uplink direction. Note that the bidirectional communications using only the second radio communication path are also carried out whenever necessary including the case where the hybrid radio terminal 700 is not located in an area covered by the first radio base station 500. To be specific, the second radio communication path can be realized by PHS (Personal Handy Phone System) or PDC (Personal Digital Cellular), for example, but it is not necessarily limited to these.

A media access control frame to be used for the radio communications between the first radio base station 500 and the hybrid radio terminal 700 is similar to the media access control frame of FIG. 2 except that a portion corresponding to the uplink channel is omitted.

The radio base station 500 has a radio interface 501, a control information transmission unit 502, a slot scheduling unit 503, a media access control identifier management unit 504, a user information transmission unit 505, a relay unit 506 and a wire interface 507.

The radio base station 500 of this embodiment mainly differs from the radio base station 100 of the above described embodiments in that a function regarding the radio reception is omitted in the first radio base station 500. To be specific, the radio interface 501 has no demodulation function. Also, the control information transmission unit 502 and the user information transmission unit 505 have no decoding function. There is another difference in order to compensate for the above noted difference of not having the radio reception function. Namely, the user information and the control information from the radio terminal, that were received through the radio interface in the radio base station 100, can be received through the wire interface 507 in the first radio base station 500. The received information will be transferred to an appropriate destination by the relay unit 506.

The media access control for the radio communications between the second radio base station 600 and the hybrid radio terminal 70-0 can be what is done in PHS for example, but it is essentially unrelated to the present invention so that its detailed description will be omitted.

The second radio base station 600 has a radio interface 601 for carrying out radio transmission and reception as well as modulation and demodulation, a control information transmission and reception unit 602 for carrying out encoding and decoding of radio control information, a user information transmission and reception unit 603 for carrying out encoding and decoding of user information, a radio communication control unit 604 for carrying out a control of set up/release of the second radio communication path and a slot control for data transmission on the second radio communication path, a relay unit 605 corresponding to a bridge function or a router function, and a wire interface 606, in order to carry out radio communications with the hybrid radio terminal 700.

The hybrid radio terminal 700 has a first radio interface 701, a control information reception unit 702, a user information reception unit 703 a media access control identifier management unit 704, a slot selection unit 705, a multicast control unit 706, a second radio interface 707, a control information transmission and reception unit 708, a user information transmission and reception unit 709, and a radio communication control unit 710.

The main difference between the hybrid radio terminal 700 of this embodiment and the radio terminal 200 of the above described embodiments is that the hybrid radio terminal 700 has a functional configuration for enabling two types of radio communications, one with respect to the first radio base station 500 and another with respect to the second radio base station 600. In other words, the hybrid radio terminal 700 has additional elements including the second radio interface 707 for carrying out radio transmission and reception as well as modulation and demodulation, the control information transmission and reception unit 708 for carrying out encoding and decoding of radio control information, the user information transmission and reception unit 709 for carrying out encoding and decoding of user information, and the radio communication control unit 710 for carrying out a control of set up/release of the second radio communication path and a slot control for data transmission on the second radio communication path, in order to carry out radio communications with the second radio base station 600. Also, in order to use two radio interfaces appropriately, the hybrid ratio terminal 700 has the relay unit 706 instead of the multicast control unit 206. The second difference is that the radio transmission function with respect to the first radio base station 500 is omitted. To be specific, the first radio interface 701 has no modulation function. Also, the control information reception unit 702 and the user information reception unit 703 have no encoding function. There are cases where the omission of such transmission functions can be effective in reducing a power consumption or a size of the terminal.

The media access control frame to be transmitted or received by the second radio base station 600 and the hybrid radio terminal 700 has the same configuration as that of FIG. 2.

In the following, a method for broadcasting the media access control identifier corresponding to the information type to be received from the first radio base station 500 to the hybrid radio terminal 700 will be described.

The media access control identifier management unit 504 manages correspondences between information type identifiers and media access control identifiers, using a correspondence table as shown in FIG. 3, similarly as in the first embodiment. The detail is the same as in the first embodiment so that it will not be repeated here. The fact that the correspondence between the information type identifier and the media access control identifier may change in time is also the same.

The media access control identifier management unit 504 selects the specific correspondence between the information type identifier and the media access control identifier at appropriate frequency, and requests the control information transmission unit 502 to transmit the selected correspondence using the second broadcast channel 406. In the above described example, transmission of the information type identifier (multicast-1, multicast-2, or multicast-3) corresponding to the media access control identifier "#3" using the second broadcast channel 406 of the media access control frame 400 at a time when the correspondence is changed will be requested. At this point, especially in the case of the multicast address, there can be cases where the information type identifier given by information of an address on the left column alone is insufficient for the receiving hybrid radio terminal 700 side to ascertain what information it is. In such cases, information of the group ID on the right column is also transmitted at the same time. The media access control identifier management unit 504 also requests transmission of the information type identifier for which the corresponding media access control identifier is lost, according to the need. The correspondence to be selected at appropriate frequency can be fixed one instead of the time varying one. However, the media access control identifier "#0" is allocated in advance to the radio control broadcast information, so that there is no need to broadcast this correspondence.

Upon receiving this request, the control information transmission unit 502 requests the slot scheduling unit 503 to allocate as many time-slots as required in transmitting that correspondence (any other information to be transmitted will also be included in the required amount) to the second broadcast channel 406 in the media access control frame 400. The control information transmission unit 502 mounts that correspondence into the allocated time-slots and transmit it through the radio interface 501.

The control information reception unit 702 gives information on the correspondence between the information type identifier and the media access control identifier to the media access control identifier management unit 704 when such a correspondence information is contained in the second broadcast channel 406 received through the first radio interface 701.

The media access control identifier management unit 704 is managing information on the information type identifier to be received by the hybrid radio terminal 700 using a correspondence table as shown in FIG. 4. The media access control identifier management unit 704 selects only those correspondences that are related to the information type identifier to be received by the hybrid radio terminal 700 from the obtained information on the correspondence between the information type identifiers and the media access control identifiers, and registers the media access control identifiers corresponding to the selected correspondences into the correspondence table of FIG. 4. In this example, it is assumed that a set of "multicast-3" and "group-3" is registered in advance as the information type identifier to be received, so that the media access control identifier "#3" that corresponds to it will be registered. If the value of "multicast-3" is apparently fixed one, there is no need for the hybrid radio terminal to maintain "group-3" part which is the right side of the information type identifier, but the value of "multicast-3" may take different values depending on time and place in general.

In the case where it is indicated that there is no media access control identifier corresponding to the information type identifier, the media access control identifier is deleted. For example, when it is indicated that the media access control identifier corresponding to "multicast-3" is lost after awhile, the media access control identifier column corresponding to "multicast-3" will be set as unallocated. However, the information type identifier itself will be left as it indicates the information type to be received by the hybrid radio terminal 700. Note that the media access control identifier of the own terminal is set as unallocated to indicate that the first radio base station 500 is not particularly aware of the existence of this radio terminal.

The media access control identifier management unit 704 notifies the media access control identifier for which the need for receiving arose and the media access control identifier for which the need for receiving disappeared, to the slot selection unit 705.

The slot selection unit 705 notifies this change to the first radio interface 701, such that the first radio interface 701 will determine portions to be transmitted or received according to this information.

The processing up to this point constitutes the method for broadcasting the media access control identifier corresponding to the information type to be received, from the first radio base station 500 to the hybrid radio terminal 700.

In the following, the processing procedure for conveying the user data up to the hybrid radio terminal 700 in the case where the first radio base station 500 actually receives the user data destined to the information type to be received. This processing procedure is slightly different for the case of point-to-point and the case of point-to-multipoint so that these two cases will be described separately.

Figure 24:
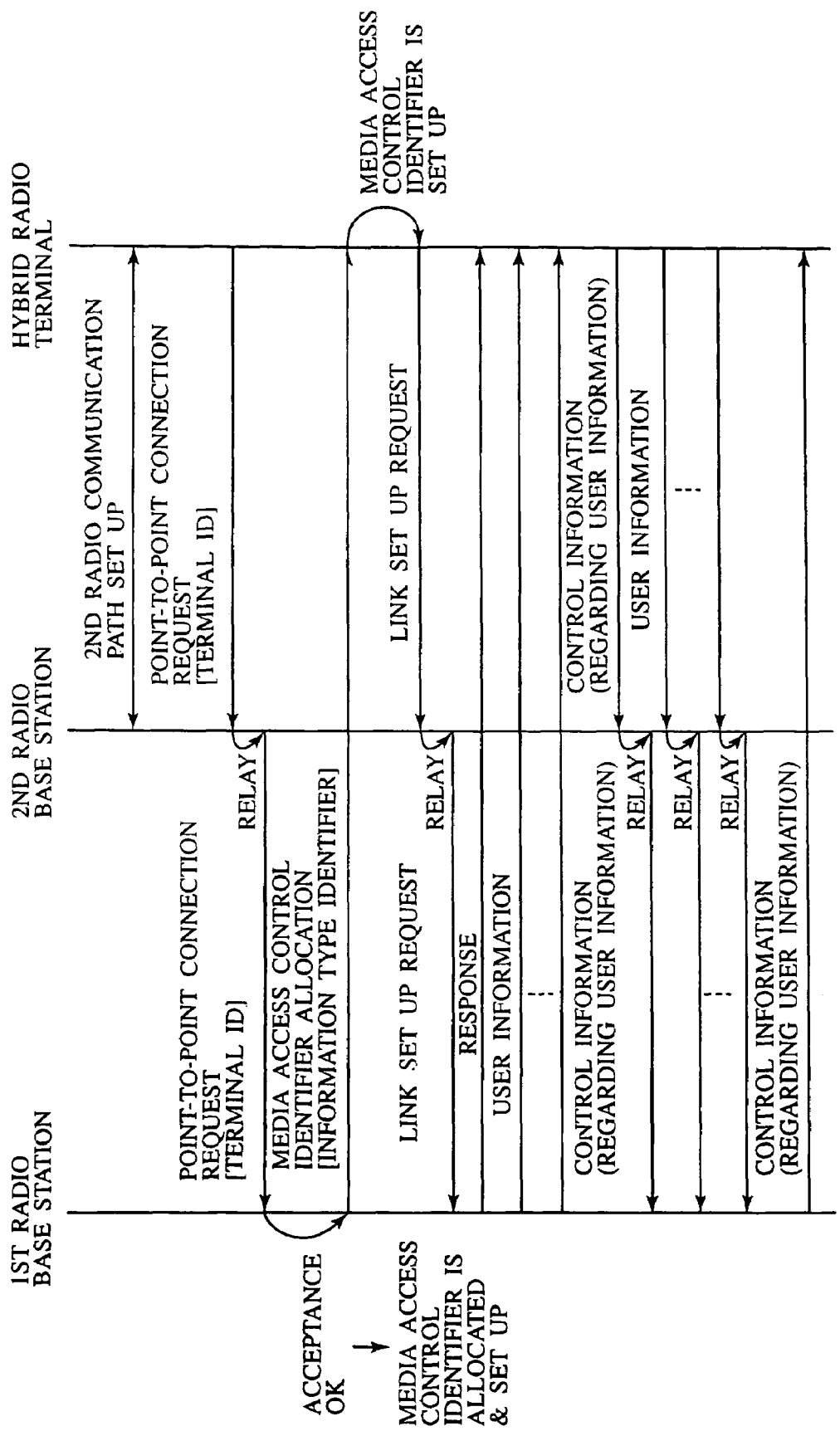
FIG. 24 is a sequence chart showing an exemplary point-to-point link connection procedure of the hybrid scheme in the radio communication system of FIG. 23.

First, the case of point-to-point will be described. FIG. 24 shows the exemplary procedure in the case of point-to-point.

The main difference from the first embodiment is that all the information in the uplink direction, that is a direction from the hybrid radio terminal 700 to the first radio base station 500 is transmitted via the second radio base station 600. The hybrid radio terminal 700 recognizes the existence of the first radio base station 500 by receiving the first broadcast channel 401 transmitted by the first radio base station 500, and the media access control identifier and the information type identifier are dynamically set in correspondence by establishing association with the first radio base station 500.

First, the second radio communication path is established between the second radio base station 600 and the hybrid radio terminal 700. This is done by exchange of the control information between the radio communication control unit 710 of the hybrid radio terminal 700 and the radio communication control unit 604 of the second radio base station 600. Here its detailed description will be omitted.

The transmission of information from the hybrid radio terminal 700 to the first radio base station 500 is carried out by utilizing the second radio communication path established in this way. More specifically, it is assumed that the hybrid radio terminal 700 already knows the information type identifier of the first radio base station 500 somehow, for example by receiving the broadcast using the second broadcast channel 406 transmitted from the first radio base station 500. The control information of the first radio communication path from the hybrid radio terminal 700 to the first radio base station 500, or the information type identifier of the first radio base station 500 attached to that information in the case of transmitting the user information, is given to the relay unit 706. The relay unit 706 transfers that information to the second radio base station 600 using the user information transmission and reception unit 709 and the second radio interface 707. The relay unit 605 of the second radio base station 600 and the wire network 800 relay information up to the wire interface 507 of the first radio base station 500.

More specifically, in order to establish the association, the hybrid radio terminal 700 transmits a connection request message for the point-to-point radio channel with respect to the first radio base station 500 toward the second radio base station 600 as the user information of the second radio communication path. Here, it is transmitted as the user information, because it is not the control information of the second radio communication path itself. As described above, the relay unit 605 of the second radio base station 600 outputs this message to the wire network 800 in order to transfer it to the first radio base station 500. This message reaches to the first radio base station 500 by being further relayed inside the wire network 800.

This connection request message contains at least the terminal ID which is the information type identifier. When this connection is possible, the media access control identifier management unit 504 of the first radio base station 500 creates the correspondence table for the information type identifier in the connection request message and the unused media access control identifier corresponding to it. Now, if the information type identifier is "terminal ID-3" as shown in FIG. 4, the media access control identifier "#6" is defined in correspondence to it in FIG. 3, for example. The first radio base station 500 returns a set of the information type identifier and the media access control identifier as a response message to that connection request message, using the second broadcast channel 406.

Upon receiving this response message, the hybrid radio terminal 700 registers that media access control identifier into the table in the media access control identifier management unit 704.

Next, a point-to-point control channel is set up between the first radio base station 500 and the hybrid radio terminal 700. This control channel comprises the individual control channel 408 in the downlink direction and one that goes via the second radio base station 600 in the uplink direction, and the setting for ensuring the connectivity in the network layer level is made here. If information on the left column of the information type identifier (such as "terminal-3" for example) is not contained in the connection request message, the setting of that value is made at this stage.

Now, when the first radio station 500 receives data through the wire interface 507 at this point, the data are given to the relay unit 506.

The relay unit 506 inquires to the media access control identifier management unit 504 about the media access control identifier corresponding to the information type identifier that either directly or indirectly indicates the destination of that data. When this happens to be information equivalent to destined to "terminal-3", the media access control identifier "#6" will be obtained from FIG. 3. The relay unit 506 requests the user information transmission unit 505 to transmit that data using the time-slot corresponding to the media access control identifier "#6" so obtained.

The user information transmission unit 505 requests the slot scheduling unit 503 to allocate the time-slot corresponding to the media access control identifier "#6".

The slot scheduling unit 503 allocates the time-slot corresponding to the media access control identifier "#6", and also requests the control information transmission unit 502 to transmit this correspondence using the frame control channel 402. At the same time, the slot scheduling unit 503 also notifies the time-slot allocated to the media access control identifier "#6" to the user information transmission unit 505.

The user information transmission unit 505 transmits the data whose transmission is requested by the relay unit 506, using the time-slot allocated by the slot scheduling unit 503. For this transmission, the user data channel 409 is used.

When the control information reception unit 702 of the hybrid radio terminal 700 receives the frame control channel 402 through the first radio interface 701, information contained in it is given to the slot selection unit 705.

The slot selection unit 705 determines the time-slot to be received from a combination of that information and information regarding the media access control identifier to be received that is obtained by inquiring to the media access control identifier management unit 704, and commands the first radio interface 701 to receive that time-slot.

In accordance with this command, the first radio interface 701 receives the data transmitted by the user information transmission unit 505 of the first radio base station 500, and gives the received user information portion to the user information reception unit 703.

Note that, usually, in the case of point-to-point, the uplink channels from the hybrid radio terminal 700 to the first radio base station 500 are also set up. In the uplink channels, the user information and the control information for the first radio communication path are both transmitted to the second radio base station 600 as the user information of the second radio communication path, and then further relayed to the first radio base station 500 via the wire network. Consequently, the detail of the procedure for transmitting the user information in the uplink direction is the same as that described at the beginning of the description of FIG. 24. The ARQ message with respect to the received user information is transmitted via the second radio communication path.

Next, the case of point-to-multipoint will be described.

In this embodiment, it is assumed that ID of the multicast information to be received by the hybrid radio terminal 700 is set in advance in the hybrid radio terminal 700 itself. Also, the media access control identifier management unit 504 of the first radio base station 500 creates in advance a correspondence table for the multicast information type identifier and the media access control identifier corresponding to it as shown in FIG. 3. The first radio base station 500 regularly broadcasts a set of the information type identifier and the media access control identifier using the second broadcast channel 406 as described above. Upon receiving this, the hybrid radio terminal 700 registers the media access control identifier into the table in the media access control identifier management unit 704 as shown in FIG. 4.

The handling from this point on can take one of the following two forms depending on the characteristic of the multicast traffic.

In the case of the broadcast type multicast, the uplink direction will not be used so that it is basically similar to the first embodiment. Namely, it suffices to replace the radio base station and the radio terminal of FIG. 6 by the first radio base station and the hybrid radio terminal.

Figure 25:
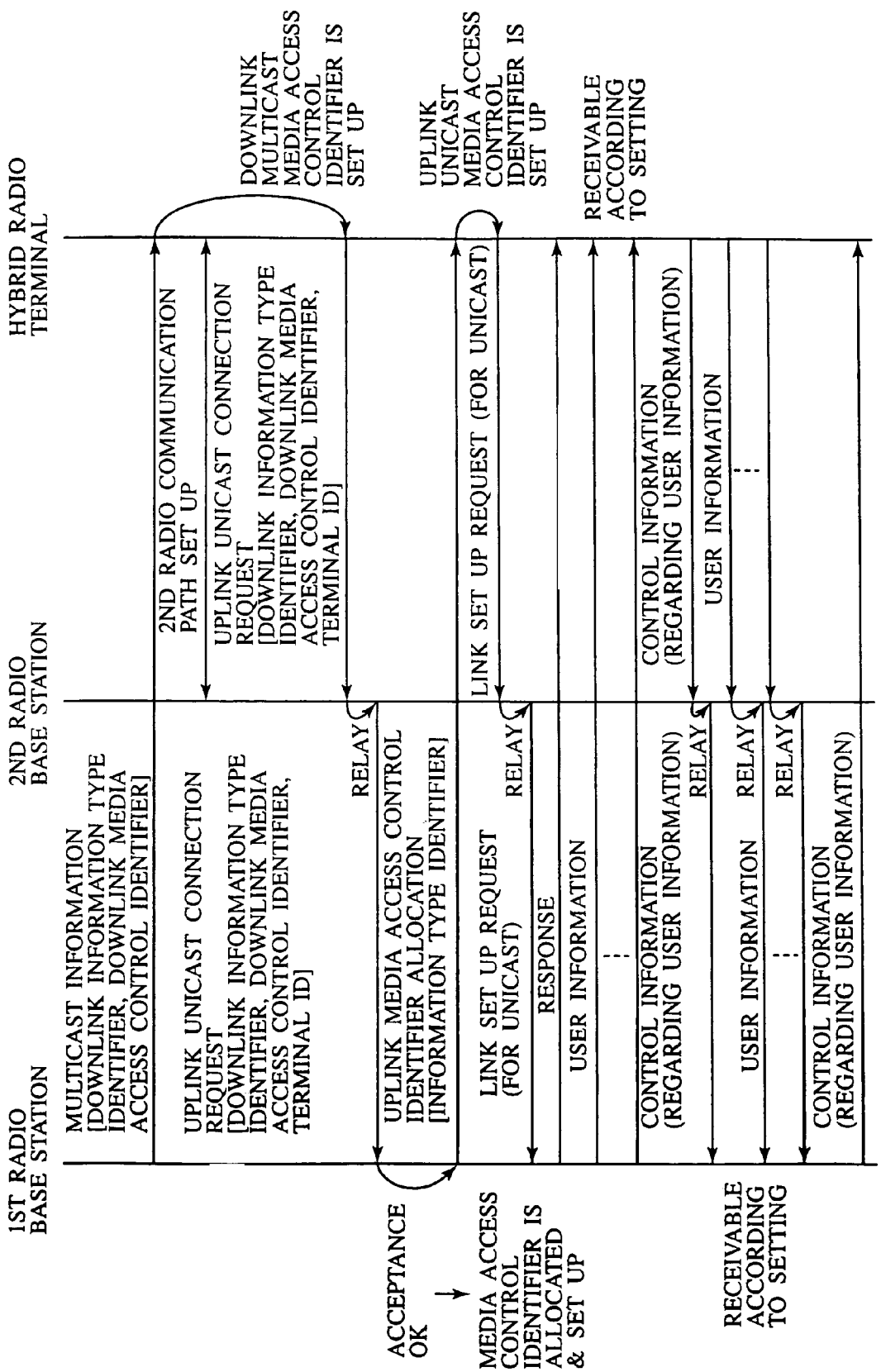
FIG. 25 is a sequence chart showing an exemplary bidirectional type multicast link connection procedure of the hybrid scheme in the radio communication system of FIG. 23.

In the case of the bidirectional type multicast, there is a need to transmit the uplink unicast connection request message for the multicast traffic from the hybrid radio terminal 700 to the first radio base station 500 using the above described method for transmitting via the second radio base station 600, similarly as in the case of point-to-point. This is similar to the above described method for establishing the association. This set up can be carried out either before or after the notification of the point-to-multipoint media access control identifier. FIG. 25 shows the exemplary procedure in the case of carrying out this set up after the notification.

First, using the above described method, the second radio communication path is established between the second radio base station 600 and the hybrid radio terminal 700. Then, the relay unit 706 creates the connection request message regarding the multicast such as the uplink unicast connection request message for the multicast traffic, and transmits it to the first radio base station 500 using the above described method of transmitting via the second radio base station 600. As a result, the downlink individual control channel 408 is set up, and further a setting is made such that the control information to be transmitted by the uplink individual control channel that is transmitted via the second radio base station 600 can be handled properly when it is received by the first radio base station 500. In the case where there is a need to transmit only the ARQ information, the downlink datalink control channel 410 is set up and further a setting is made such that the ARQ information to be transmitted by the uplink datalink control channel that is transmitted via the second radio base station 600 can be handled properly when it is received by the first radio base station 500 in addition. Also, in the case where there is a need to transmit the user information on the uplink side, in addition to the setting for the datalink control, the downlink user data channel 409 is set up and further a setting is made such that the user information to be transmitted by the uplink user data channel that is transmitted via the second radio base station 600 can be handled properly when it is received by the first radio base station 500. Note however that there can be cases where the downlink user data channel 409 is not set up as it will not be used. These settings are made by the procedure similar to the case of point-to-point.

In either one of the above described cases, the following operations are common.

Namely, when the first radio base station 500 receives data through the wire interface 507, this data is given to the relay unit 506.

The relay unit 506 inquires the media access control identifier management unit 504 about the media access control identifier corresponding to the information type identifier that directly or indirectly indicates the destination of that data. Here, it is assumed that the information type identifier is "multicast-3". Then, the media access control identifier "#3" is obtained. The relay unit 506 requests the user information transmission unit 505 to transmit that data using the time-slot corresponding to the media access control identifier "#3" so obtained.

The user information transmission unit 505 requests the slot scheduling unit 503 to allocate the time-slot corresponding to the media access control identifier "#3".

The slot scheduling unit 503 allocates the time-slot corresponding to the media access control identifier "#3", and requests the control information transmission unit 502 to transmit this correspondence using the frame control channel 402. At the same time, the slot scheduling unit 503 notifies the time-slot allocated to the media access control identifier "#3" to the user information transmission unit 505.

The user information transmission unit 505 transmits the data whose transmission is requested by the relay unit 506, using the time-slot allocated by the slot scheduling unit 503.

When the control information reception unit 702 of the hybrid radio terminal 700 receives the frame control channel 402 through the first radio interface 701, the information contained in it is given to the slot selection unit 705.

The slot selection unit 705 determines the time-slot to be received from a combination of that information and the information regarding the media access control identifier to be received that is obtained by inquiring to the media access control identifier management unit 704, and commands the first radio interface 701 to received that time-slot.

According to this command, the first radio interface 701 receives the data transmitted by the user information transmission unit 505, and gives it to the user information reception unit 703.

Figure 26:
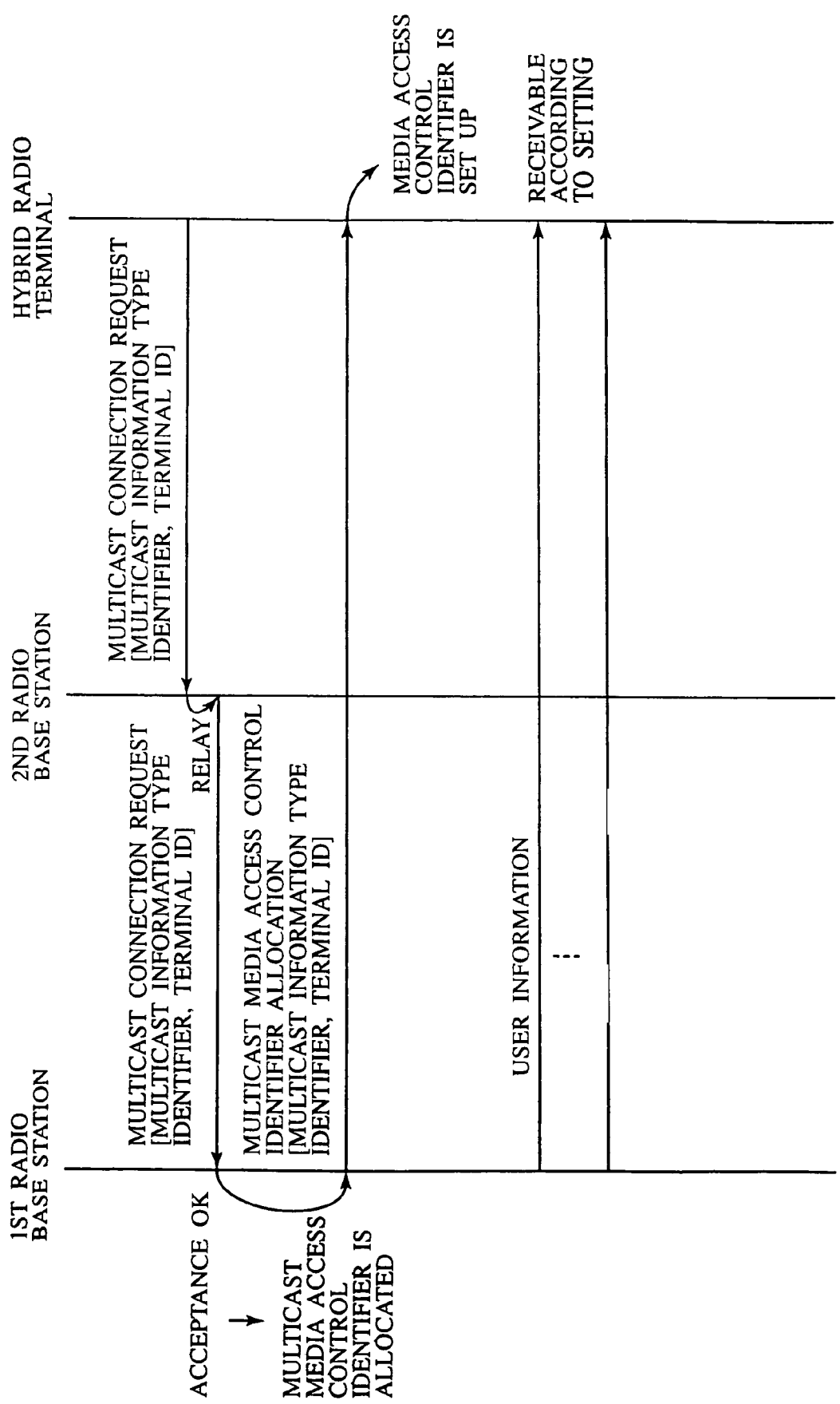
FIG. 26 is a sequence chart showing an exemplary broadcast type multicast link connection procedure of the hybrid scheme using a connection request from a radio terminal according to the seventh embodiment of the present invention.
Figure 27:
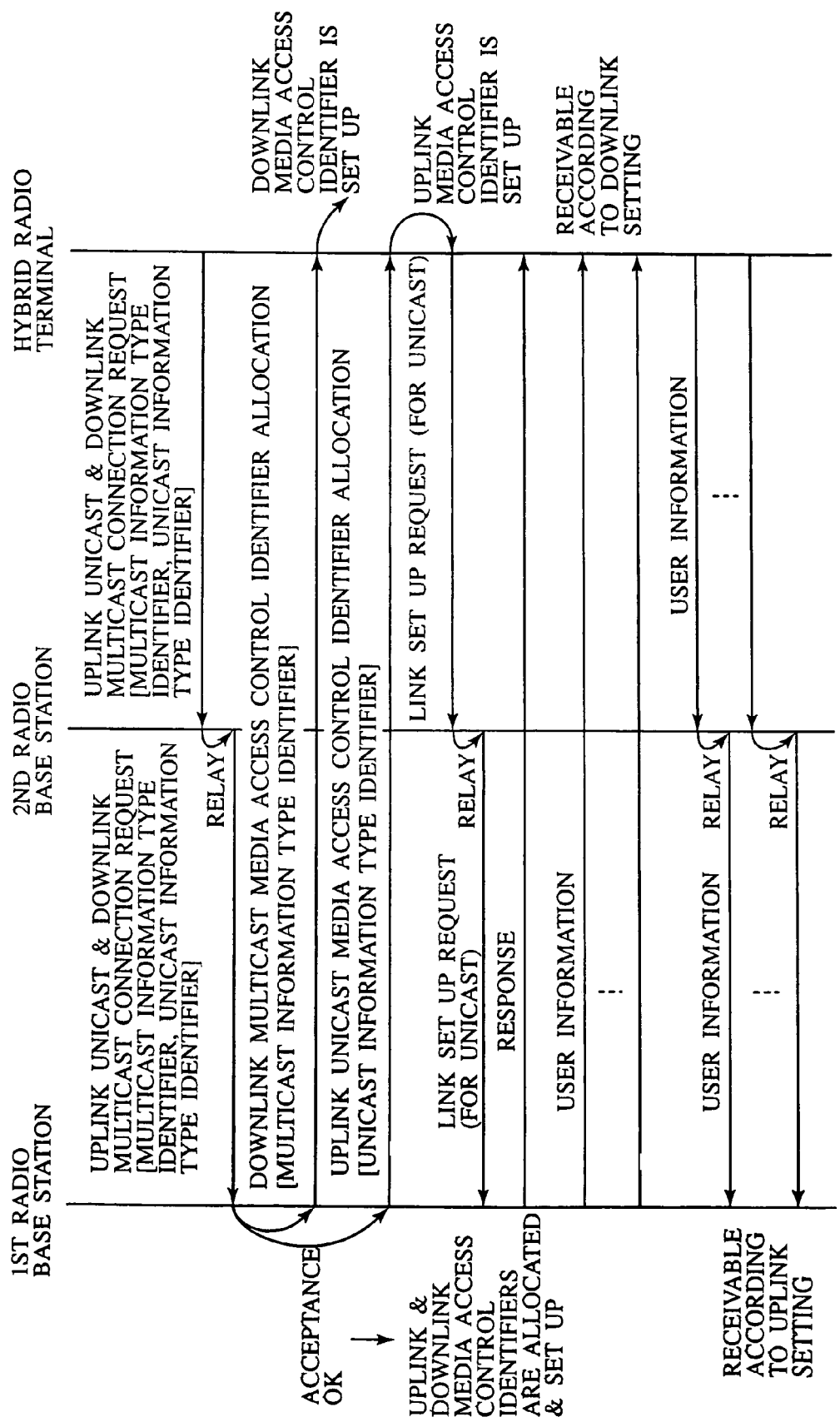
FIG. 27 is a sequence chart showing an exemplary bidirectional type multicast link connection procedure of the hybrid scheme using a connection request from a radio terminal according to the seventh embodiment of the present invention.
Figure 28:
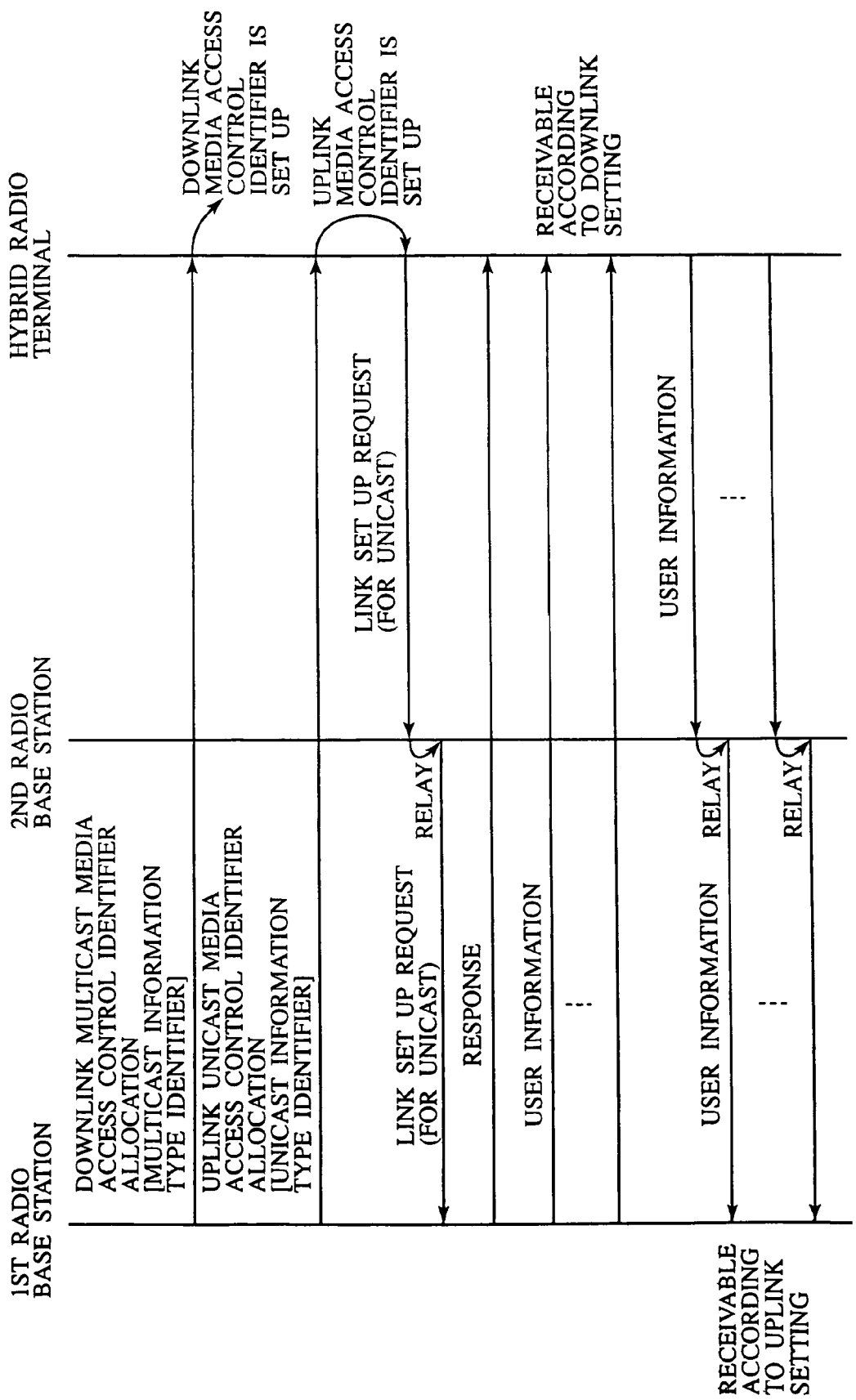
FIG. 28 is a sequence chart showing an exemplary bidirectional type multicast link connection procedure of the hybrid scheme using a known radio terminal information according to the seventh embodiment of the present invention.

Referring now to FIG. 26 to FIG. 28, the seventh embodiment of a radio communication system according to the present invention will be described in detail.

The seventh embodiment is directed to the case of realizing the second embodiment in the hybrid scheme. The handling of the point-to-point is the same as in the sixth embodiment, but a way of realizing the point-to-multipoint is different. In the following, the differences from the sixth embodiment will be mainly described.

The media access control identifier management unit 504 of the first radio base station 500 and the media access control identifier management unit 704 of the hybrid radio terminal 700 are similar to those of FIG. 23, but unlike the sixth embodiment, the correspondence between the multicast media access control identifier and the information type identifier is not notified to all the hybrid radio terminals located in that area. Namely, there is provided an information regarding which hybrid radio terminals are actually requiring the information on the correspondence, and the information on the media access control identifier is given by way of a message destined to such a hybrid radio terminal. However, because it is the point-to-multipoint communications, the media access control identifier allocated by the first radio base station 500 with respect to the same multicast communication transmission request from a plurality of hybrid radio terminals will be identical.

There are following two methods for comprehending hybrid radio terminals that will receive the multicast, for example.

(1) A method in which those hybrid radio terminals that wish to receive a certain multicast communication (broadcasting, for example) are to make a request for the notification of the media access control identifier for the purpose of that multicast communication to the first radio base station 500.

(2) A method in which a correspondence table of an ID of each hybrid radio terminal 700 and the information type identifiers of the multicasts that each hybrid radio terminal 700 wishes to receive is provided at the first radio base station 500 side (or at a server within a wire network 800), and the first radio base station 500 notifies values of the media access control identifiers for the required multicast communications from that table to that hybrid radio terminal 700 when that hybrid radio terminal 700 makes the location registration to the first radio base station 500.

Moreover, there is a difference between the broadcast type multicast and the bidirectional type multicast similarly as in the sixth embodiment, in each one of these methods. In the following, examples of these four cases will be described one by one.

First, the method (1) in the broadcast type multicast will be described. FIG. 26 shows the exemplary procedure in this case. Here it is assumed that the second radio communication path is already established.

The hybrid radio terminal 700 creates the downlink multicast connection request message containing "terminal ID" and the information type identifiers of "multicast-3" and "group ID-3" at the relay unit 706, and this message is transmitted to the first radio base station 500 via the second radio base station 600.

Upon receiving this connection request message, the first radio base station 500 broadcasts a message indicating that a specific terminal ID is set as the destination, and a pair of the received information type identifier and the media access control identifier corresponding to that information type identifier which is allocated by the media access control identifier management unit 504, using the second broadcast channel 406. Although the same broadcast channel is used, in contrast to the sixth embodiment where the information reception and the content comprehension are requested to all the hybrid radio terminals, this embodiment differs in that the channel destined to the specific hybrid radio terminal is sent so that hybrid radio terminals other than the corresponding one will receive the message but discard it without looking into its content.

After receiving the second broadcast channel 406 destined to the own terminal, the first radio interface 701 of the hybrid radio terminal 700 gives its content to the media access control identifier management unit 704 via the control information transmission and reception unit 202. Then, the media access control identifier is registered into the table in a manner of FIG. 4, and its value is given to the slot selection unit 705.

Although the above description presupposes that an appropriate pair of the information type identifier and the media access control identifier is registered in the table of the media access control identifier management unit 504 with respect to the connection request message from the hybrid radio terminal 700, there is no guarantee that such a pair always exists. Namely, such a pair may not exist in the table of the media access control identifier management unit 504 when signals of the multicast requested by the hybrid radio terminal 700 are not received from a server in the wire network 800 yet because there is no other radio terminal that has received them until then. In such a case, the first radio base station 500 requests reception of these multicast signals with respect to the wire network 800 side. Also, the first radio base station 500 registers a pair of a new multicast information type identifier and a new media access control identifier corresponding to it into the table of the media access control identifier management unit 504. A possibility for such a situation to arise is always present in the case where the hybrid radio terminal 700 issues the connection request message requesting reception of the multicast.

Next, the method (2) in the broadcast type multicast will be described.

In this case the uplink direction will not be used so that it suffices to replace the radio base station and the radio terminal in the description of FIG. 14 of the second embodiment by the first radio base station 500 and the hybrid radio terminal. No other change is required.

Next, the method (1) in the bidirectional type multicast will be described. FIG. 27 shows the exemplary procedure in this case. Here it is assumed that the second radio communication path is already established.

The hybrid radio terminal 700 sends the downlink multicast/uplink unicast connection request message containing both the information type identifiers of "multicast-3" and "group ID-3" and the information type identifier of the hybrid radio terminal 700, to the first radio base station 500 via the second radio base station 600.

Upon receiving this connection request message, the first radio base station 500 newly allocates the uplink unicast media access control identifier at the media access control identifier management unit 504. No information will be sent in the uplink direction using the first radio communication path, but this media access control identifier will be used in the case where the control information transmitted in the uplink direction by the second radio communication path will be sent to the downlink direction. It can also be utilized by the first radio base station 500 in ascertaining which hybrid radio terminal has received the datalink control information for the downlink multicast information. Then, the first radio base station 500 broadcasts a message indicating that a specific terminal ID is set as the destination, and a pair of the received information type identifier and the media access control identifier corresponding to it, using the second broadcast channel 406, for each one of the downlink multicast and the uplink unicast.

As a result, the downlink individual control channel 408 is set up, and further a setting is made such that the control information to be transmitted by the uplink individual control channel that is transmitted via the second radio base station 600 can be handled properly when it is received by the first radio base station 500. In the case where there is a need to transmit only the ARQ information, the downlink datalink control channel 410 is set up and further a setting is made such that the ARQ information to be transmitted by the uplink datalink control channel that is transmitted via the second radio base station 600 can be handled properly when it is received by the first radio base station 500 in addition. In other words, it is the setting for enabling identification as to which hybrid radio terminal has transmitted the datalink control information for the downlink multicast information. Also, in the case where there is a need to transmit the user information on the uplink side, in addition to the setting for the datalink control, the downlink user data channel 409 is set up and further a setting is made such that the user information to be transmitted by the uplink user data channel that is transmitted via the second radio base station 600 can be handled properly when it is received by the first radio base station 500. Note however that there can be cases where the downlink user data channel 409 is not set up as it will not be used. These settings are made by the procedure similar to the case of point-to-point.

After receiving the second broadcast channel 406 destined to the own terminal, the first radio interface 701 of the hybrid radio terminal 700 gives its content to the media access control identifier management unit 704 via the control information reception unit 702. Then, two media access control identifiers are registered into the table in a manner of FIG. 4, and their values are given to the slot selection unit 705.

Note that this embodiment uses a message format for requesting both uplink and downlink connections simultaneously, but it is also possible to define them separately.

Next, the method (2) in the bidirectional type multicast will be described. FIG. 28 shows the exemplary procedure in this case. Here it is assumed that the second radio communication path is already established.

When the hybrid radio terminal 700 makes the location registration, the first radio base station 500 obtains information regarding the group ID of the multicast that hybrid radio terminal 700 should receive, from the table of the media access control identifier management unit 504 in the first radio base station 500, or from a server in the wire network 800, or else from information communicated before moving in the case where that hybrid radio terminal 700 has moved from the other radio base station by the handover.

Then, when it is ascertained that this hybrid radio terminal 700 is requesting acquisition of the user information regarding the information type identifier of "multicast-3" and "group ID-3", the first radio base station 500 broadcasts a message indicating that a specific terminal ID is set as the destination, a pair of the downlink multicast information type identifier and the media access control identifier corresponding to it, and a pair of the uplink unicast information type identifier and the media access control identifier corresponding to it, using the second broadcast channel 406.

After receiving the second broadcast channel 406 destined to the own terminal, the first radio interface 701 of the hybrid radio terminal 700 gives its content to the media access control identifier management unit 704 via the control information reception unit 702. Then, two media access control identifiers are registered into the table in a manner of FIG. 4, and their values are given to the slot selection unit 705.

In any one of the above described multicast cases, the following operations are common.

Namely, when the first radio base station 500 receives data through the wire interface 507, this data is given to the relay unit 506.

The relay unit 506 inquires the media access control identifier management unit 504 about the media access control identifier corresponding to the information type identifier that directly or indirectly indicates the destination of that data. Here, it is assumed that the information type identifier is "multicast-3". Then, the media access control identifier "#3" is obtained. The relay unit 506 requests the user information transmission unit 505 to transmit that data using the time-slot corresponding to the media access control identifier "#3" so obtained.

The user information transmission unit 505 requests the slot scheduling unit 503 to allocate the time-slot corresponding to the media access control identifier "#3".

The slot scheduling unit 503 allocates the time-slot corresponding to the media access control identifier "#3", and requests the control information transmission unit 502 to transmit this correspondence using the frame control channel 402. At the same time, the slot scheduling unit 503 notifies the time-slot allocated to the media access control identifier "#3" to the user information transmission unit 505.

The user information transmission unit 505 transmits the data whose transmission is requested by the relay unit 506, using the time-slot allocated by the slot scheduling unit 503.

When the control information reception unit 702 of the hybrid radio terminal 700 receives the frame control channel 402 through the first radio interface 701, the information contained in it is given to the slot selection unit 705.

The slot selection unit 705 determines the time-slot to be received from a combination of that information and the information regarding the media access control identifier to be received that is obtained by inquiring to the media access control identifier management unit 704, and commands the first radio interface 701 to received that time-slot.

According to this command, the first radio interface 701 receives the data transmitted by the user information transmission unit 505, and gives it to the user information reception unit 703.

Note that the third, fourth and fifth embodiments can also be realized by the hybrid scheme of the sixth and seventh embodiments. It should be apparent that the configuration of the sixth embodiment, the configuration of the seventh embodiment, a configuration in which the third embodiment is realized by the hybrid scheme, a configuration in which the fourth embodiment is realized by the hybrid scheme, and a configuration in which the fifth embodiment is realized by the hybrid scheme can be practiced in any suitable combination.

As described, according to the present invention, it becomes possible for the radio base station to carry out both point-to-point user information communications and point-to-multipoint user information communications with respect to radio terminals.

It is to be noted that, in the above description, the user information on a given layer for a specific user may contain not just the user data to be exchanged at upper layers, but also the control information for that specific user at that given layer as well. In particular, the user information to be transmitted on a unicast channel may contain the control information so that the control information for the multicast can be transmitted on a unicast channel that is set up in advance.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A radio base station device, comprising:
   a reception unit configured to receive a connection request from one radio terminal;
   a set up unit configured to set up a datalink connection with respect to said one radio terminal;
   a first allocation unit configured to allocate a first media access control identifier which is an unused media access control identifier, to said one radio terminal that issued the connection request;
   a broadcast unit configured to broadcast a correspondence between the first media access control identifier and said one radio terminal;
   a second allocation unit configured to allocate both a second media access control identifier and a datalink connection identifier to an identifier of a multicast information that are to be received by a plurality of radio terminals, the datalink connection identifier being used to transmit uplink information related to the multicast information;
   a first transmission unit configured to transmit a correspondence information for enabling said plurality of radio terminals to recognize a correspondence between the second media access control identifier and the identifier of the multicast information; and
   a second transmission unit configured to transmit a time-slot corresponding to the first media access control identifier with a user information destined to said one radio terminal loaded thereon, and a time-slot corresponding to the second media access control identifier with the multicast information loaded thereon.

2. The radio base station device of claim 1, wherein the first transmission unit transmits the correspondence information using a radio control broadcast channel that is set to be received by any radio terminal located within an area of the radio base station device.

3. The radio base station device of claim 1, further comprising a unit configured to obtain information on a correspondence between said one radio terminal and the identifier of the multicast information that said one radio terminal wishes to receive,
   wherein the first transmission unit transmits the correspondence information to said one radio terminal, using either a radio control broadcast channel that is set to be received by any radio terminal located within an area of the radio base station device or a time-slot corresponding to the first media access control identifier.

4. The radio base station device of claim 1, further comprising:
   a third allocation unit configured to allocate a broadcast media access control identifier to be received by any radio terminal located within an area of the radio base station device; and
   a notification unit configured to notify any radio terminal located within the area of the radio base station device to receive the broadcast media access control identifier, using a radio control broadcast channel that is set to be received by any radio terminal located within the area of the radio base station device.

5. The radio base station device of claim 1, wherein the second allocation unit allocates a media access control identifier that is set to be received by any radio terminal located within an area of the radio base station device as the second media access control identifier.

6. The radio base station device of claim 1, wherein the reception unit receives the connection request that contains a multicast connection request, from said one radio terminal.

7. A radio terminal device, comprising:
   a transmission unit configured to transmit a connection request to a radio base station;

a set up unit configured to set up a datalink connection with respect to the radio base station;

a first reception unit configured to receive a first media access control identifier allocated to the radio terminal device, which is broadcast from the radio base station;

a second reception unit configured to receive an identifier of a multicast information to be received by a plurality of radio terminals and both a second media access control identifier and a datalink connection identifier allocated to the identifier of the multicast information, which are transmitted from the radio base station, the datalink connection identifier being used to transmit uplink information related to the multicast information; and a third reception unit configured to receive a user information destined to the radio terminal device which is loaded on a time-slot corresponding to the first media access control identifier, and the multicast information which is loaded on a time-slot corresponding to the second media access control identifier.

8. The radio terminal device of claim 7, wherein the transmission unit transmits the connection request that contains a multicast connection request.

9. A method of information communication from a radio base station to a radio terminal, comprising the steps of:

making a connection request from the radio terminal to the radio base station;

setting up a datalink connection between the radio terminal and the radio base station;

allocating a first media access control identifier which is an unused media access control identifier, to the radio terminal, at the radio base station which received the connection request;

transmitting a correspondence between the first media access control identifier and the radio terminal, from the radio base station to the radio terminal;

transmitting a user information from the radio base station to the radio terminal using a time-slot corresponding to the first media access control identifier;

allocating both a second media access control identifier and a datalink connection identifier to a multicast information to be received by a plurality of radio terminals, at the radio base station, the datalink connection identifier being used to transmit uplink information related to the multicast information;

transmitting a correspondence information for enabling said plurality of radio terminals to recognize a correspondence between the second media access control identifier and the identifier of the multicast information; and transmitting the multicast information from the radio base station to said plurality of radio terminals using a time-slot corresponding to the second media access control identifier.

10. The radio terminal device of claim 7, further comprising a fourth reception unit configured to receive a broadcast media access control identifier to be received by any radio terminal located within an area of the radio base station, wherein the third reception unit also receives information loaded on a time-slot corresponding to the broadcast media access control identifier.

11. The radio terminal device of claim 7, wherein the transmission unit transmits the connection request that contains a multicast connection request.

12. A method of information communication from a radio base station to a radio terminal, comprising the steps of:

making a connection request from the radio terminal to the radio base station;

setting up a datalink connection between the radio terminal and the radio base station;

allocating a first media access control identifier which is an unused media access control identifier, to the radio terminal, at the radio base station which received the connection request;

transmitting a correspondence between the first media access control identifier and the radio terminal, from the radio base station to the radio terminal;

transmitting a user information from the radio base station to the radio terminal using a time-slot corresponding to the first media access control identifier;

allocating both a second media access control identifier and a datalink connection identifier to a multicast information to be received by a plurality of radio terminals, at the radio base station, the datalink connection identifier being used to transmit uplink information related to the multicast information;

transmitting a correspondence information for enabling said plurality of radio terminals to recognize a correspondence between the second media access control identifier and the identifier of the multicast information; and transmitting the multicast information from the radio base station to said plurality of radio terminals using a time-slot corresponding to the second media access control identifier.

* * * * *